(12) United States Patent
Goto et al.

(10) Patent No.: US 11,520,446 B2
(45) Date of Patent: Dec. 6, 2022

(54) SENSOR, INPUT DEVICE, AND ELECTRONIC DEVICE

(71) Applicant: SONY CORPORATION, Tokyo (JP)

(72) Inventors: Tetsuro Goto, Tokyo (JP); Tomoko Katsuhara, Kanagawa (JP); Akira Ebisui, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 132 days.

(21) Appl. No.: 16/498,023

(22) PCT Filed: Feb. 14, 2018

(86) PCT No.: PCT/JP2018/005073
§ 371 (c)(1),
(2) Date: Sep. 26, 2019

(87) PCT Pub. No.: WO2018/186022
PCT Pub. Date: Oct. 11, 2018

(65) Prior Publication Data
US 2021/0109627 A1    Apr. 15, 2021

(30) Foreign Application Priority Data

Apr. 3, 2017 (JP) .............................. JP2017-073812

(51) Int. Cl.
*G06F 3/044* (2006.01)

(52) U.S. Cl.
CPC .......... *G06F 3/0445* (2019.05); *G06F 3/0447* (2019.05)

(58) Field of Classification Search
CPC .... G06F 3/0445; G06F 3/0447; G06F 1/1626; G06F 1/169; G06F 2203/0339; G06F 1/1684; G06F 1/1686; G06F 1/1694; G06F 2203/04103; G06F 2203/04105; G06F 3/04164; G06F 3/04182; G06F 3/04144; G06F 3/0448; H01L 35/02

See application file for complete search history.

(56) References Cited

U.S. PATENT DOCUMENTS

| | | | |
|---|---|---|---|
| 2014/0358318 A1* | 12/2014 | Lin | G05D 23/1927 700/300 |
| 2015/0280708 A1* | 10/2015 | Goto | G06F 3/023 341/33 |
| 2018/0067601 A1* | 3/2018 | Winokur | G06F 3/0447 |
| 2018/0101040 A1* | 4/2018 | Liu | G06F 1/1658 |

FOREIGN PATENT DOCUMENTS

| | | |
|---|---|---|
| JP | H10-246647 | 9/1998 |
| JP | 2000-214035 | 8/2000 |
| JP | 2006-071501 | 3/2006 |
| JP | 2015-194948 | 11/2015 |

OTHER PUBLICATIONS

International Search Report prepared by the Japan Patent Office dated Apr. 23, 2018, for International Application No. PCT/JP2018/005073.

* cited by examiner

*Primary Examiner* — Patrick N Edouard
*Assistant Examiner* — Joseph P Fox
(74) *Attorney, Agent, or Firm* — Sheridan Ross P.C.

(57) ABSTRACT

Provided is a sensor including a sensor electrode unit including: a sensing unit of a capacitance type that detects pressing; and a temperature detection sensing unit of a capacitance type provided in an area corresponding to the sensing unit.

10 Claims, 25 Drawing Sheets

FIG. 11
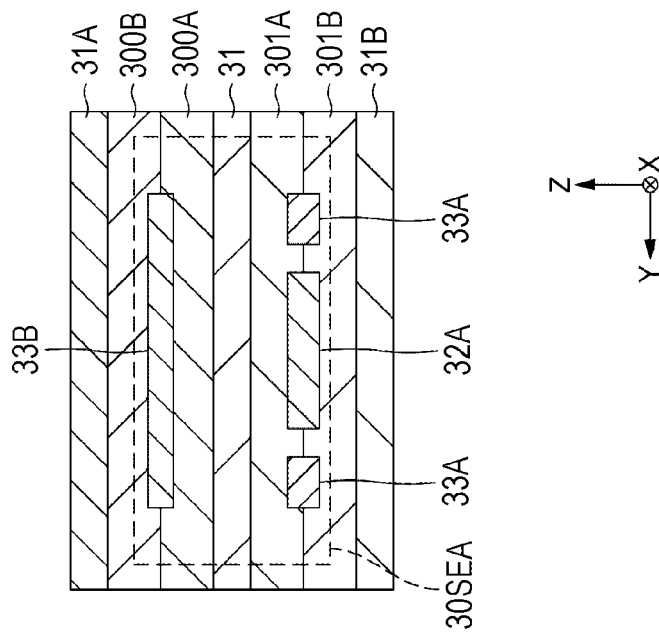
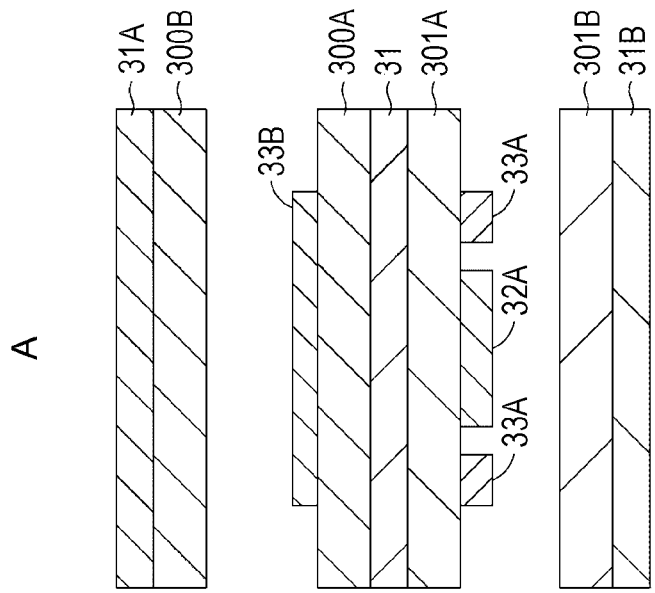

SENSOR, INPUT DEVICE, AND ELECTRONIC DEVICE

TECHNICAL FIELD

The present technology relates to a sensor, an input device, and an electronic device.

BACKGROUND ART

In recent years, a sensor capable of electrostatically detecting input operation is widely used in various electronic devices such as a mobile personal computer (PC) and a tablet PC. Patent Document 1 below describes a sensor including a capacitive element as a sensor for a keyboard, and capable of detecting an operation position and pressing force of an operation element on an input operation surface.

CITATION LIST

Patent Document

Patent Document 1: Japanese Patent Application Laid-Open No. 2015-194948

SUMMARY OF THE INVENTION

Problems to be Solved by the Invention

In this field, it has been desired to improve operation detection accuracy by the sensor.

An object of the present technology is to provide a sensor, an input device, and an electronic device enabled to improve operation detection accuracy.

Solutions to Problems

The present technology is, for example, a sensor including a sensor electrode unit including: a sensing unit of a capacitance type that detects pressing; and a temperature detection sensing unit of a capacitance type provided in an area corresponding to the sensing unit.

The present technology may be an electronic device including the sensor.

Effects of the Invention

According to the present technology, operation detection accuracy can be improved. Note that, the effect described here is not necessarily limited, and can be any effect described in the present disclosure.

BRIEF DESCRIPTION OF DRAWINGS

FIG. 5 is a diagram for describing a configuration example of a sensor electrode unit.

FIGS. 11A and 11B are diagrams for describing an example of a method of manufacturing the temperature detection sensing unit.

MODE FOR CARRYING OUT THE INVENTION

One embodiment of the present technology will be described in the following order.
Circuit of electronic device
Circuit configuration of electronic device
Each area of electronic device
Operation of sensor
Effect example
Modifications

[Configuration of Electronic Device]

Figure 1A:
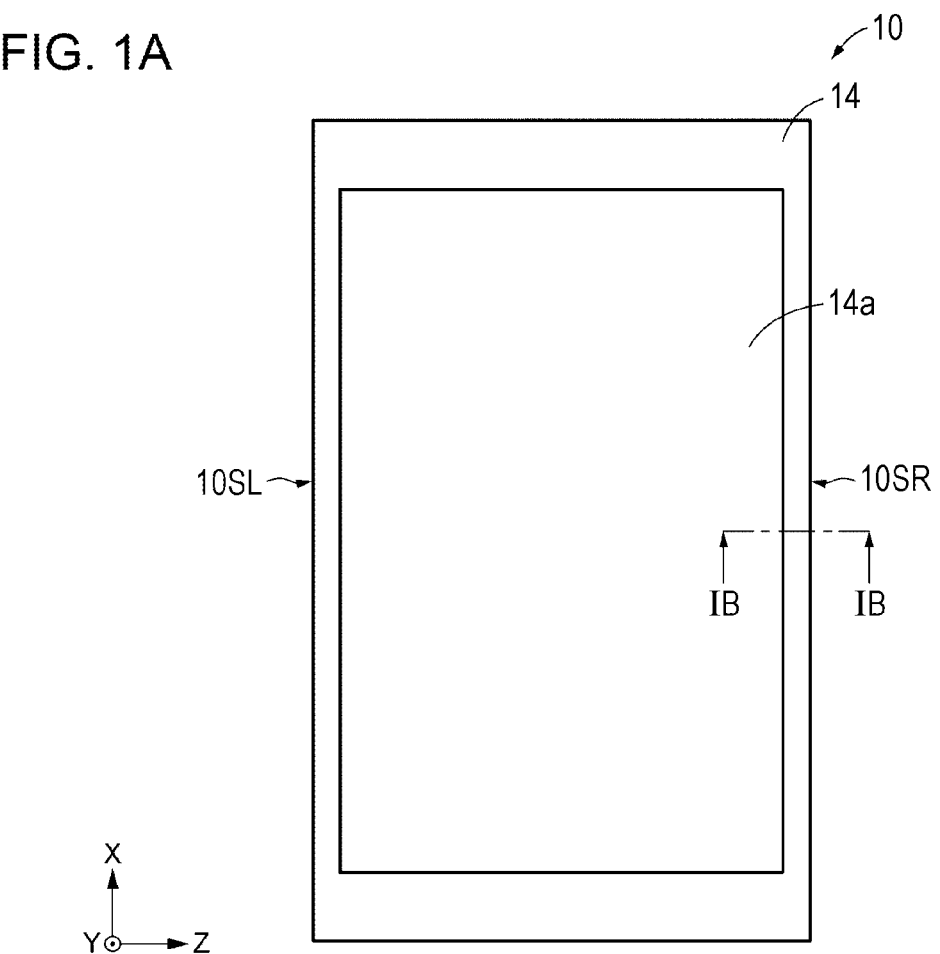
FIG. 1A is a plan view illustrating an appearance of an electronic device according to an embodiment of the present technology.
Figure 1B:
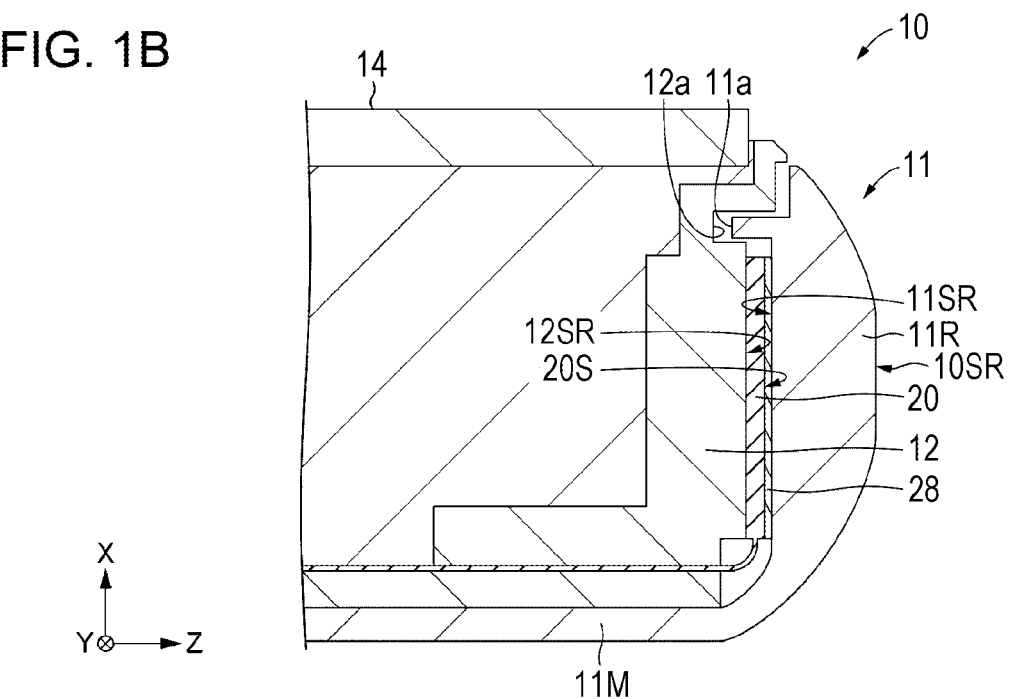
FIG. 1B is a cross-sectional view taken along line IB-IB of FIG. 1A.
Figure 2:
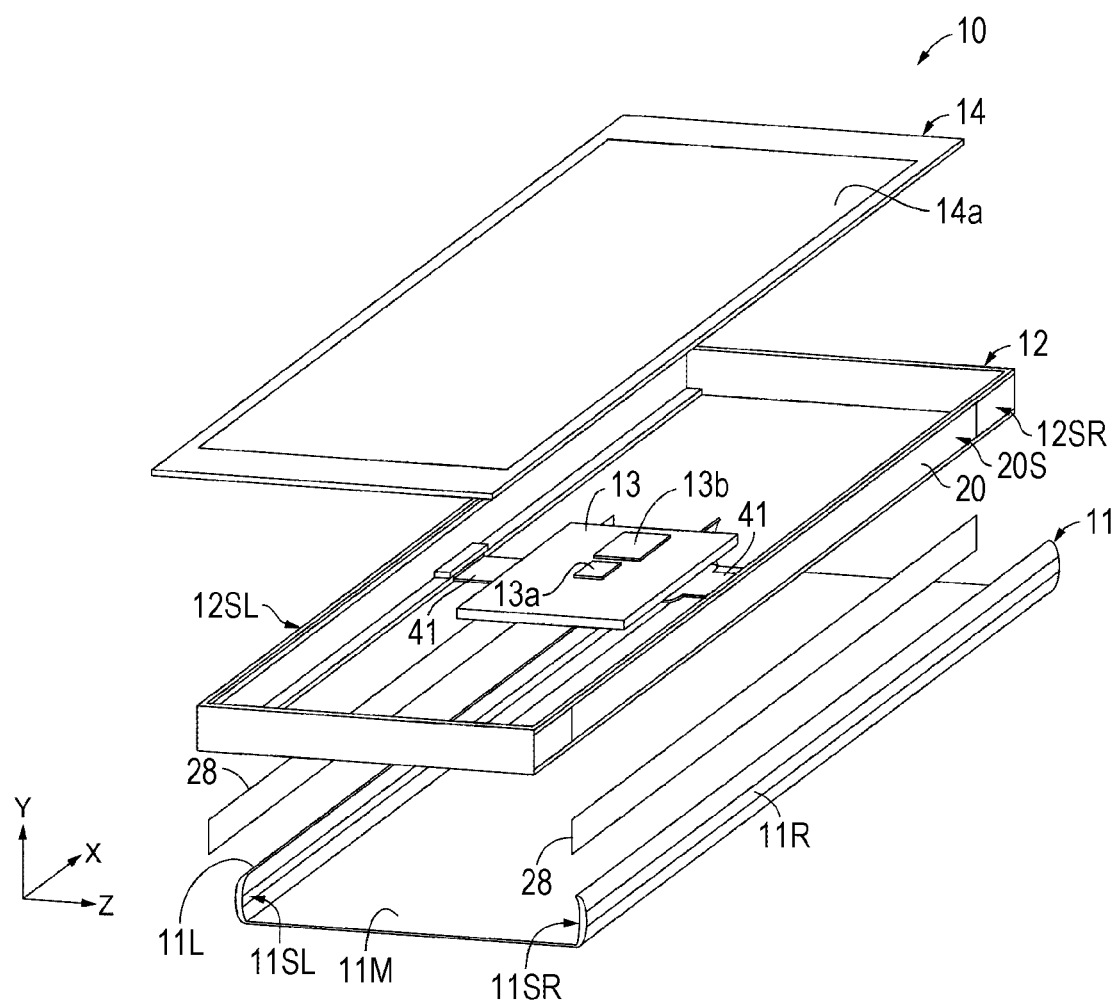
FIG. 2 is an exploded perspective view illustrating a configuration of the electronic device according to the embodiment of the present technology.

An electronic device 10 according to an embodiment of the present technology will be described with reference to FIGS. 1A, 1B, and 2. The electronic device 10 according to the embodiment of the present technology is a so-called smartphone, and includes: an exterior body 11 that is a housing; two sensors 20 and 20 each including a sensing surface (first surface) 20S and a back surface (second surface) on an opposite side of the sensor from the sensing surface; a frame 12 as a support that supports the sensors 20 and 20 such that inner side surfaces 11SR and 11SL of the exterior body 11 and sensing surfaces 20S respectively face each other; first deformation layers 28 and 28 respectively provided between the sensing surfaces 20S and the inner side surfaces 11SR and 11SL; a substrate 13 arranged in the frame 12; and a front panel 14 provided on the frame 12.

In the electronic device 10, by pressing the side surfaces 10SR and 10SL with a hand, a finger, or the like, it is possible to execute (1) wake-up operation, (2) slide operation, (3) automatic start-up operation of a camera application, (4) right hand/left hand detection function, and the like.

The exterior body 11, the sensors 20, the first deformation layers 28, and the frame 12 as the support constitute an input device. The input device may further include the substrate 13 as needed.

(Exterior Body)

The exterior body 11 includes a main surface portion 11M having a rectangular shape and constituting the back surface of the electronic device 10, and side wall portions 11R and 11L respectively provided on both long sides of the main surface portion 11M. The frame 12 is accommodated between the side wall portions 11R and 11L. The side wall portions 11R and in are enabled to press the sensing surfaces 20S via the first deformation layers 28 when the side wall portions 11R and 11L are pressed toward the sensing surfaces 20S. A protruding portion 11a is provided in the vicinity of the tip of the inner side surface 11SR. The protruding portion 11a engages with a recess portion 12a provided on a support surface 12SR of the frame 12. The inner side surface 11SL and a support surface 12SL also have configurations similar to those of the inner side surface 11SR and the support surface 12SR, respectively.

The exterior body 11 contains, for example, metal, polymer resin, wood, or the like. Examples of the metal include single substances such as aluminum, titanium, zinc, nickel, magnesium, copper, and iron, or an alloy containing two or more of these. Specific examples of the alloy include stainless used steel (SUS), aluminum alloy, magnesium alloy, titanium alloy, and the like. Examples of the polymer resin include a copolymer synthetic resin of acrylonitrile, butadiene, and styrene (ABS resin), a polycarbonate (PC) resin, a PC-ABS alloy resin, and the like.

(Frame)

In a plan view of the frame 12 in a direction perpendicular to the main surface portion 11M, the frame 12 has a rectangular shape slightly smaller than the main surface portion 11M. The frame 12 includes the support surfaces 12SR and 12SL respectively facing the inner side surfaces 11SR and 11SL of the side wall portions 11R and 11L. The sensor 20 is supported on the support surface 12SR such that the inner side surface 11SR of the side wall portion 11R and the sensing surface 20S face each other. The first deformation layer 28 is provided between the sensing surface 20S and the inner side surface 11SR. The sensor 20 is supported on the support surface 12SL such that the inner side surface 11SL of the side wall portion 11L and the sensing surface 20S face each other. The first deformation layer 28 is provided between the sensing surface 20S and the inner side surface 11SL.

(Substrate)

The substrate 13 is a main substrate of the electronic device 10, and includes a controller integrated circuit (IC) (hereinafter simply referred to as "IC") 13a, and a main central processing unit (CPU) (hereinafter referred to simply as "CPU") 13b. The IC 13a is a control unit that controls the two sensors 20 and detects pressure applied to each of the sensing surfaces 20S. The CPU 13b is a control unit that controls the entire electronic device 10. For example, the CPU 13b executes various types of processing on the basis of a signal supplied from the IC 13a.

(Front Panel)

The front panel 14 includes a display device 14a, and a touch panel of a capacitance type is provided on the front surface of the display device 14a. The display device 14a displays an image (screen) on the basis of a video signal or the like supplied from the CPU 13b. Examples of the display device 14a include a liquid crystal display, an electro luminescence (EL) display, and the like, but are not limited thereto.

(Sensor)

Figure 3A:
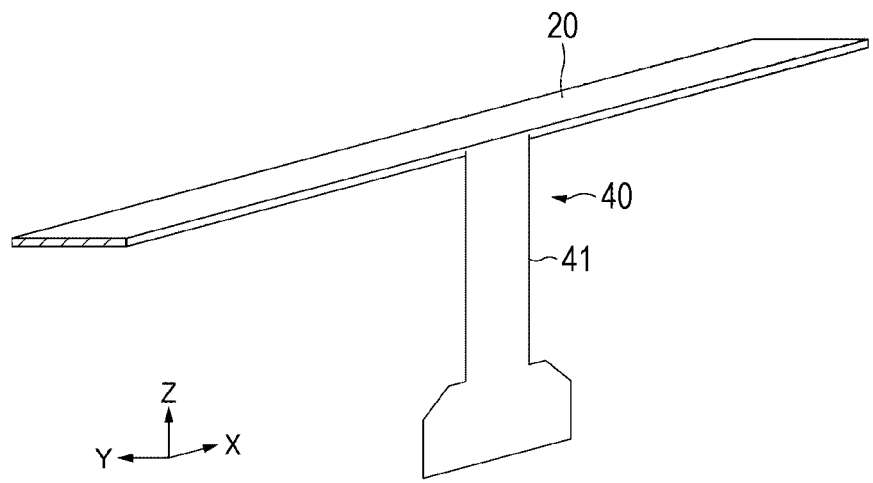
FIG. 3A is a perspective view illustrating an example of a shape of a sensor.
Figure 7:
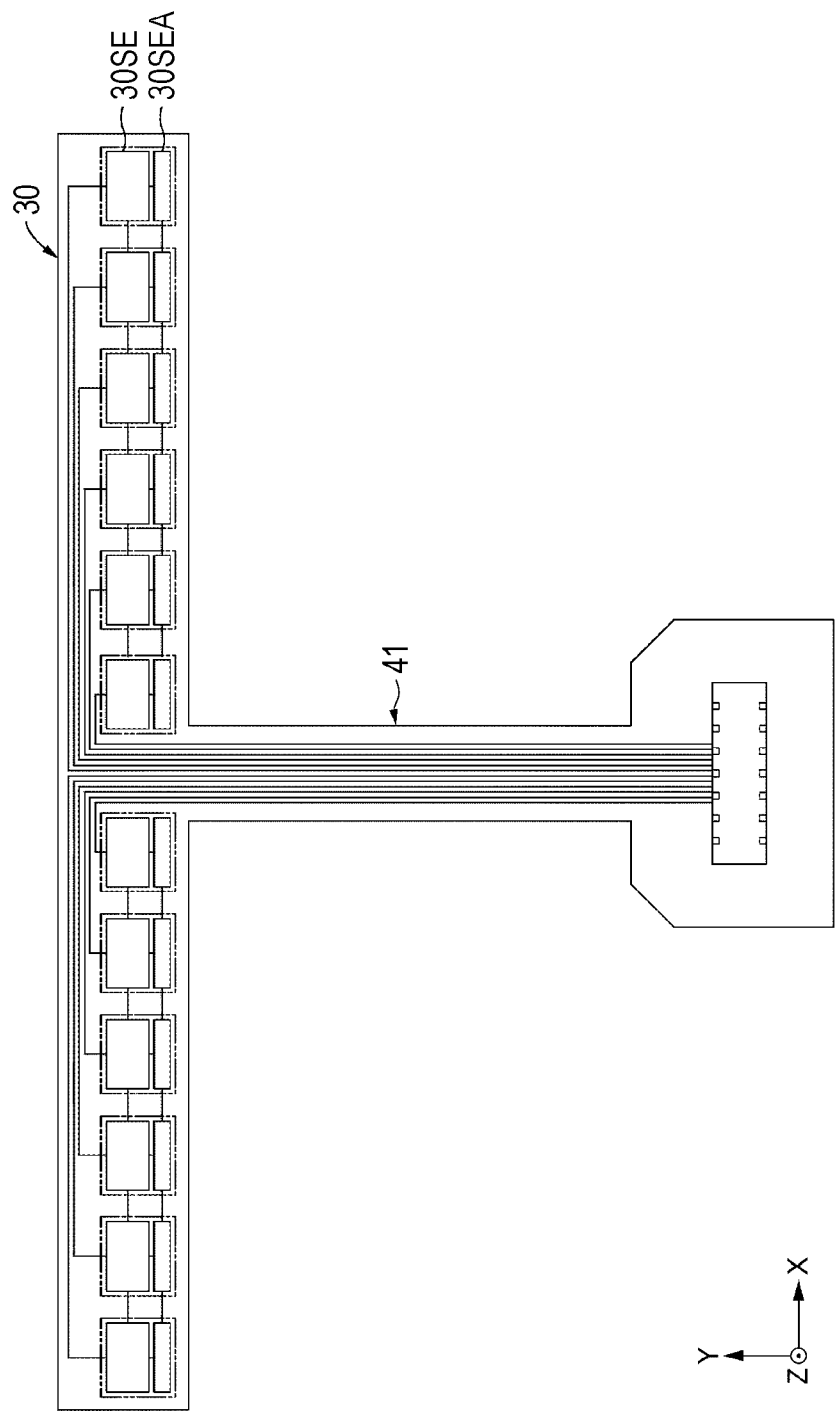
FIG. 7 is a plan view illustrating a configuration example of a flexible printed circuit.

The sensor 20 is a so-called pressure-sensitive sensor, and as illustrated in FIG. 3A, has a long rectangular shape. A connection unit 41 is extended from the center of a long side of the sensor 20. More specifically, as illustrated in FIG. 7, the sensor 20 includes a sensor electrode unit 30 having a long rectangular shape, and the connection unit 41 is extended from the center of a long side of the sensor electrode unit 30. The sensor electrode unit 30 and the connection unit 41 are integrally formed by one flexible printed circuit (hereinafter referred to as "FPC") 40.

Figure 3B:
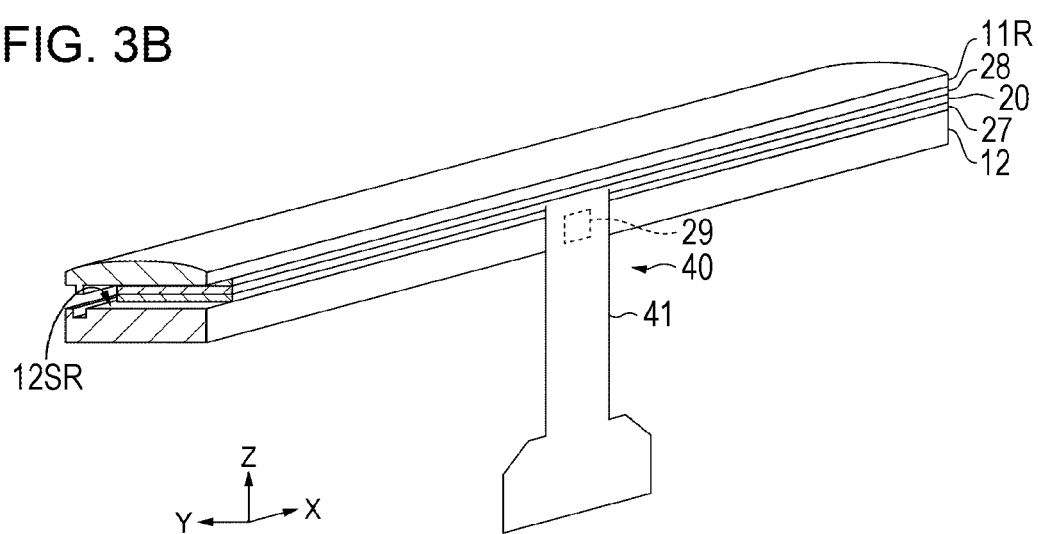
FIG. 3B is a perspective view illustrating an example of an arrangement form of the sensor.

As illustrated in FIG. 3B, the sensor 20 on the side wall portion 11R side is bonded to the support surface 12SR of the frame 12 with an adhesive layer 27 interposed therebetween. The sensor 20 on the side wall portion lit side is also bonded to the support surface 12SL similarly to the sensor 20 of the side wall portion 11R. Furthermore, since noise is generated when force is applied to the FPC 40, the connection unit 41 is preferably bonded to the frame 12 with an adhesive layer 29 interposed therebetween.

Figure 4:
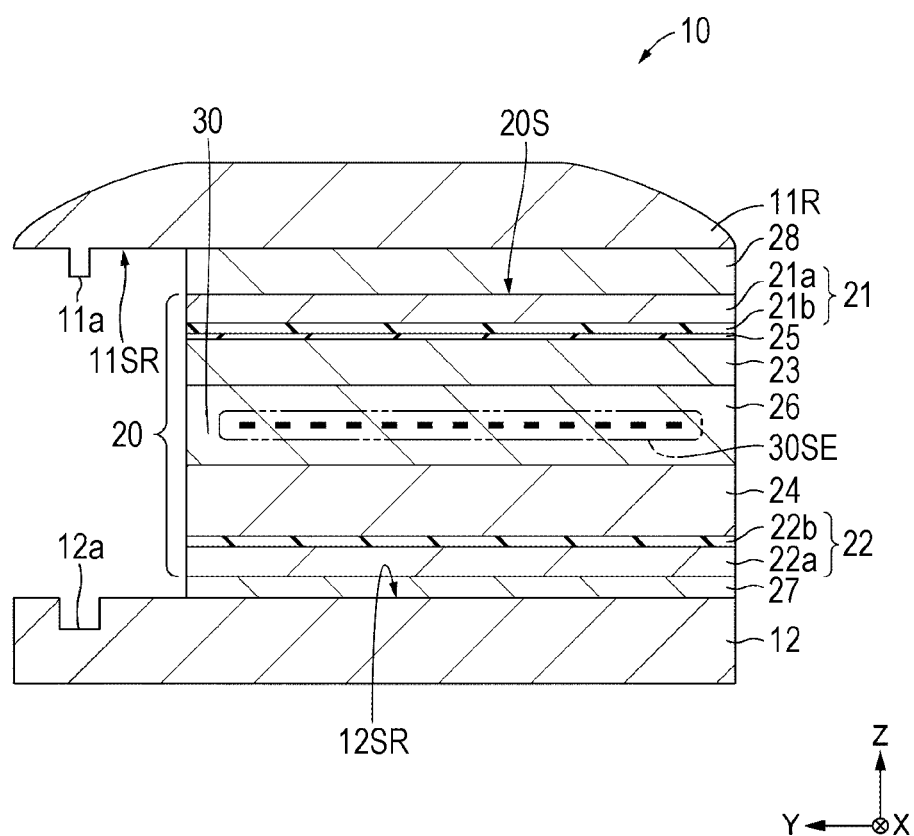
FIG. 4 is a cross-sectional view illustrating a configuration example of the sensor.

The sensor 20 is a so-called pressure-sensitive sensor, and as illustrated in FIG. 4, includes: the sensor electrode unit 30 of a capacitance type including a plurality of sensing units 30SE and the like; electrode bases 21 and 22; second deformation layers 23 and 24; and adhesive layers 25 to 27. The back surfaces of the sensors 20 are respectively bonded to the support surfaces 12SR and 12SL. Note that, in the present description, longitudinal directions of the sensor 20 are referred to as ±X-axis directions, width directions (short directions) are referred to as ±Y-axis directions, and directions perpendicular to the longitudinal directions and the width directions (in other words, directions perpendicular to the sensing surface 20S) are referred to as ±Z-axis directions.

The electrode base 21 and the sensor electrode unit 30 are arranged such that main surfaces of the electrode base 21 and the sensor electrode unit 30 face each other. The second deformation layer 23 is provided between the main surfaces of the electrode base 21 and the sensor electrode unit 30, and is elastically deformed by the pressure applied to the sensing surface 20S. The second deformation layer 23 and the electrode base 21 are bonded together by the adhesive layer 25, and the second deformation layer 23 and the sensor electrode unit 30 are bonded together by the adhesive layer 26.

The electrode base 22 and the sensor electrode unit 30 are arranged such that main surfaces of the electrode base 22 and the sensor electrode unit 30 face each other. The second deformation layer 24 is provided between the electrode base 22 and the sensor electrode unit 30, and is elastically deformed by the pressure applied to the sensing surface 20S. The second deformation layer 24 includes an adhesive and also has a function as an adhesive layer, and the electrode base 22 and the sensor electrode unit 30 are bonded together by the second deformation layer 24.

(Problems to be Considered for Sensor Electrode Unit)

Figure 5:
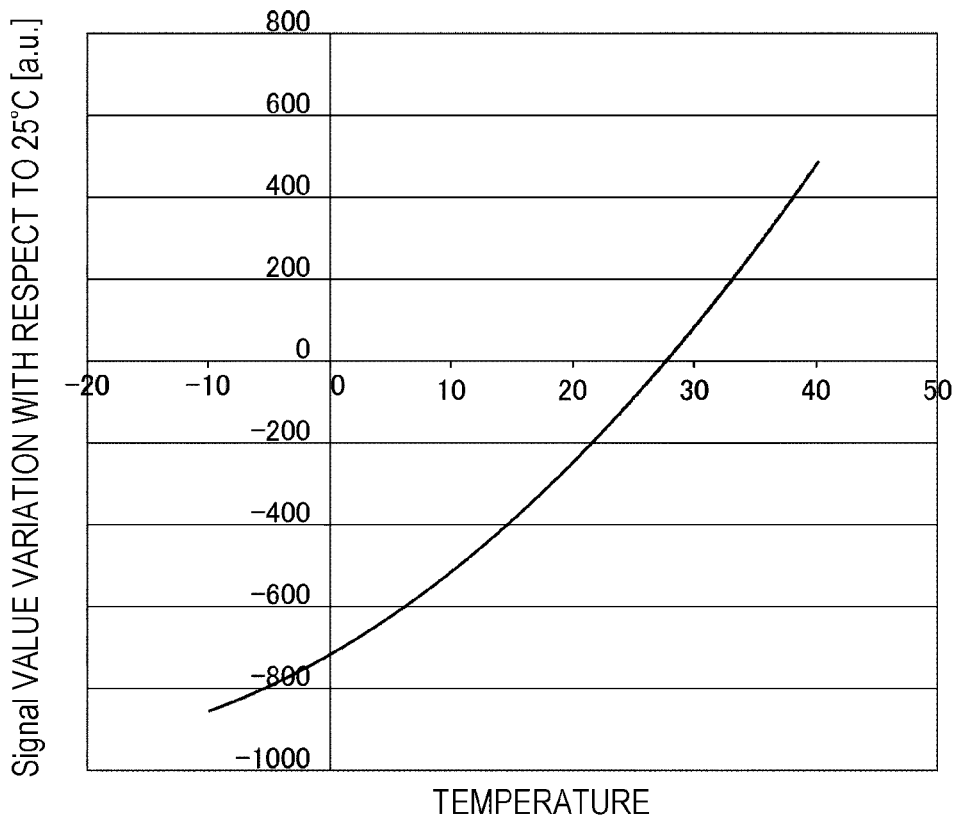
FIG. 5 is a diagram for describing a problem to be considered in the sensor.

Here, problems to be considered for the sensor electrode unit 30 will be described. In general, the sensor electrode unit schematically includes a pulse electrode and a sense electrode, and detects operation by detecting a capacitance change between the pulse electrode and the sense electrode. As in the present embodiment, when the smartphone as the electronic device is held and operated by a hand, temperature (body temperature) of the hand is transmitted to the sensor and its temperature is changed, and a Signal value varies largely. Here, the Signal value refers to capacitance of a capacitive element in a state where there is no operation input (no load). For example, as illustrated in FIG. 5, variation can be seen with respect to the Signal value of the reference temperature (for example, 25° C.) depending on the temperature. Note that, in FIG. 5 and the like, the value of each axis may be indicated as an arbitrary unit (a.u.) normalized by using a predetermined reference value. As a result, problems occur such as unintended erroneous detection of operation at no load, and a large variation of a capacitance change amount (hereinafter referred to as a Delta value, as appropriate) of the capacitive element at the time of operation input (at load). As a result of studying causes of the problems, the present inventors have considered that a main cause is a change of a dielectric constant between the pulse electrode and the sense electrode depending on the temperature. The problems are referred to as problems due to dielectric constant temperature dependency.

Figure 6:
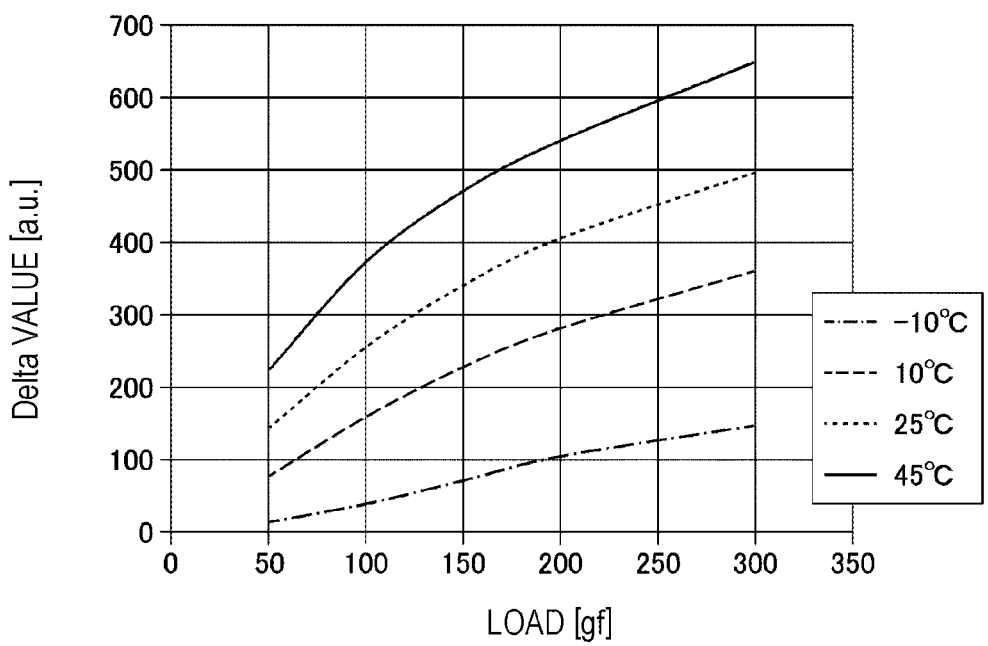
FIG. 6 is a diagram for describing a problem to be considered in the sensor.

On the other hand, as illustrated in FIG. 6, the Delta value output at the same load (for example, 150 (gf)) largely varies depending on the temperature of the sensor. As a result, problems occur such as a change of an operation load at the time of pressing the smartphone, and deviation of detection coordinates. As a result of analysis of the present inventors, it is considered that the problems are mainly due to the fact that hardness of sensor components (for example, adhesive layer) becomes higher as the temperature becomes lower. The problems are referred to as problems due to Young's modulus temperature dependency. On the basis of these problems, a structure of the sensor 20 according to the embodiment will be described in detail.

(Sensor Electrode Unit)

Figure 9:
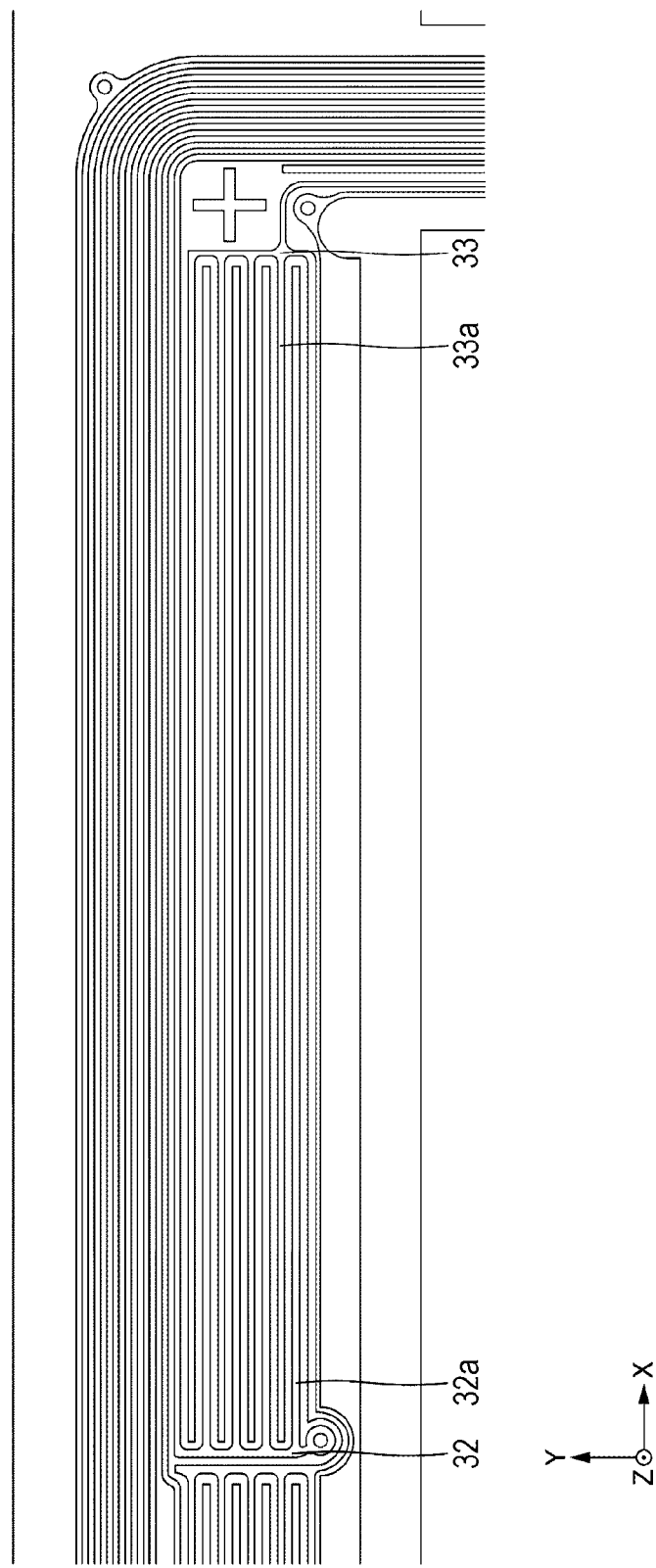
FIG. 9 is a diagram for describing a configuration example of a sensing unit.
Figure 10:
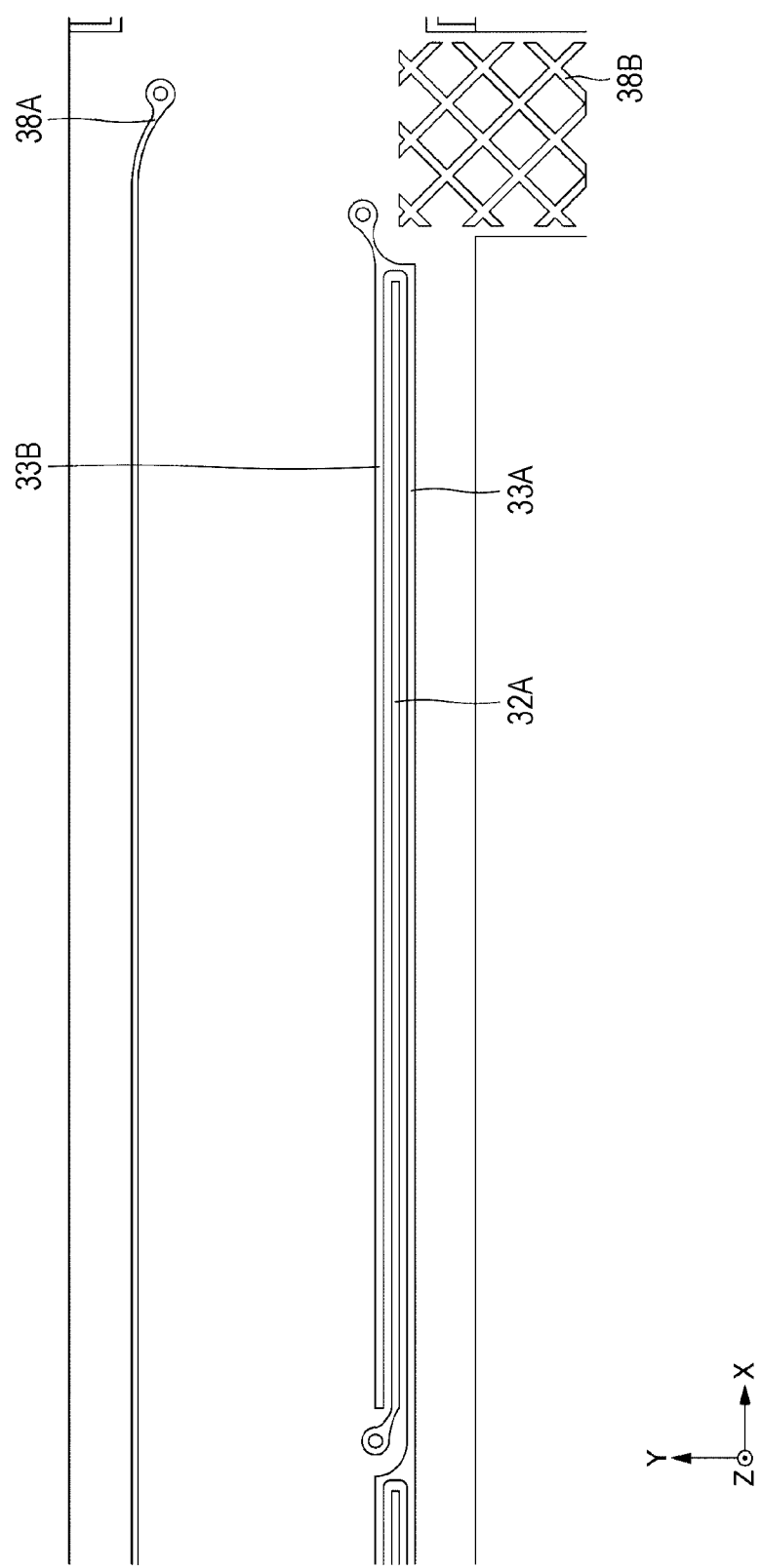
FIG. 10 is a diagram for describing a configuration example of a temperature detection sensing unit.

The sensor electrode unit 30 will be described in detail with reference to FIGS. 7 to 10. FIG. 7 is a diagram of the sensor electrode unit 30 viewed from the Z direction, FIG. 8 is a diagram illustrating a cross section of the sensor electrode unit 30, and FIGS. 9 and 10 are diagrams for describing a more detailed configuration of the sensor electrode unit 30.

As described above, the sensor electrode unit 30 has a long rectangular shape, and is part of the FPC 40. The sensor electrode unit 30 is part of the FPC 40 as described above, whereby the number of parts can be reduced. Furthermore, impact durability of connection can be improved between the sensor 20 and the substrate 13. As illustrated in FIG. 7, the FPC 40 includes the sensor electrode unit 30 and the connection unit 41 extended from the center of the long side of the sensor electrode unit 30. The sensor electrode unit 30 includes the plurality of sensing units 30SE and a plurality of temperature detection sensing unit 30SEA. The temperature detection sensing units 30SEA each function as a kind of temperature sensor without sensitivity at the time of pressing. Temperature detection sensing units 30SEA are respectively provided in areas corresponding to the sensing units 30SE, and in this example, each of the temperature detection sensing units 30SEA is paired with a corresponding one of the sensing units 30SE as illustrated in FIG. 7.

Figure 8:
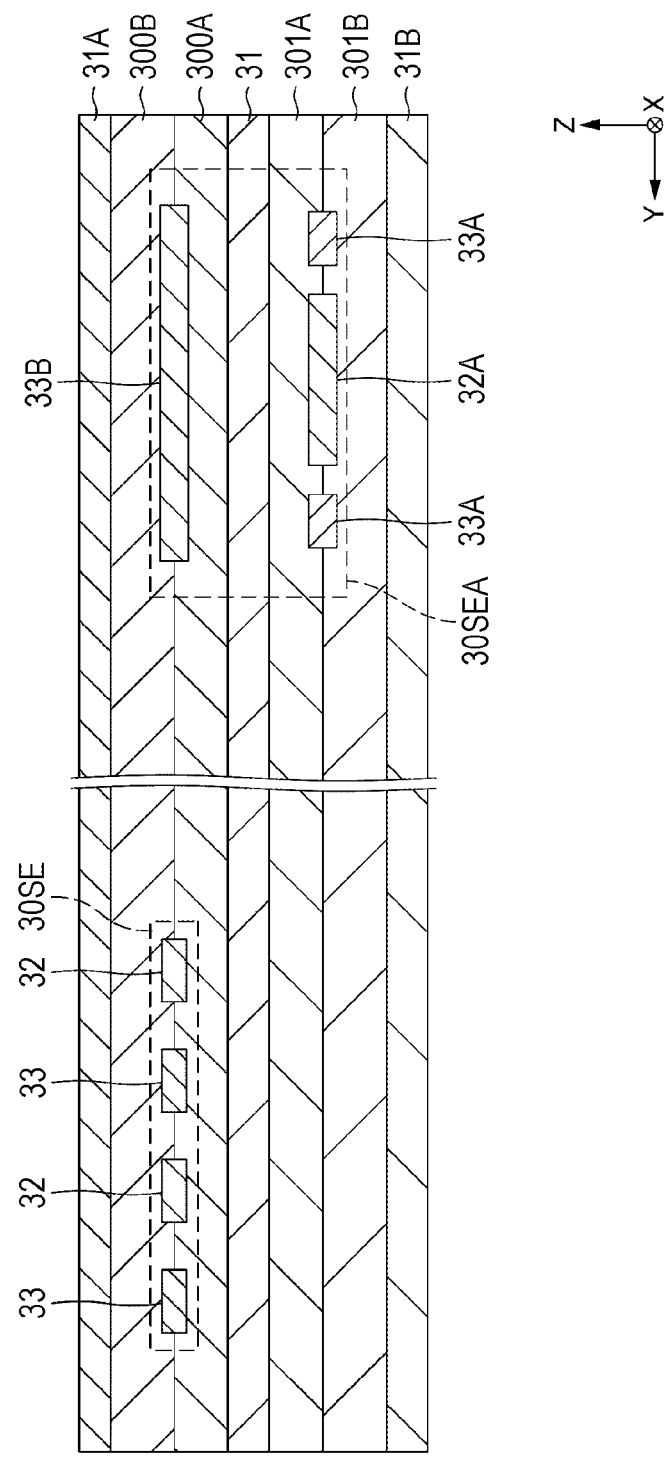

As illustrated in FIG. 8, a first adhesive layer 300A and a second adhesive layer 300B respectively including different adhesives are formed on the front side (upper side) of the base 31, and a base 31A is formed on the front side of the second adhesive layer 300B. On the other hand, a third adhesive layer 301A and a fourth adhesive layer 301B respectively including different adhesives are formed on the back side (lower side) of the base 31, and a base 31B is formed on the back side of the fourth adhesive layer 301B. As the bases 31A and 31B, bases similar to the base 31 can be applied. A thermosetting adhesive such as an epoxy adhesive can be applied to each adhesive layer.

A pulse electrode 32 (an example of a first electrode) and a sense electrode 33 (an example of a second electrode) constituting the sensing unit 30SE are included in an adhesive layer including the first adhesive layer 300A and the second adhesive layer 300B. Furthermore, a pulse electrode 32A and two sense electrodes 33A constituting the temperature detection sensing unit 30SEA are included in an adhesive layer including the third adhesive layer 301A and the fourth adhesive layer 301B. Furthermore, a sense electrode 33B constituting the temperature detection sensing unit 30SEA is included in the adhesive layer including the first adhesive layer 300A and the second adhesive layer 300B.

The sense electrode 33B is larger than the pulse electrode 32A, and is provided to cover the pulse electrode 32A. As illustrated in FIG. 8, an adhesive layer (for example, the first adhesive layer 300A, the third adhesive layer 301A) is interposed between the pulse electrode 32A and the sense electrode 33B. The two sense electrodes 33A are provided, for example, on both sides (or may be on one side) in the horizontal direction of the pulse electrode 32A.

As illustrated in FIG. 9, the sensor electrode unit 30 includes the pulse electrode 32 and the sense electrode 33 provided on one main surface of the base 31 having flexibility. The pulse electrode 32 includes a plurality of unit electrode bodies 32a on a straight line extending in the X-axis direction from a rod-like connecting portion extended in the Y-axis direction in FIG. 9. The sense electrode 33 includes a plurality of unit electrode bodies 33a on a straight line extending in the X-axis direction from a rod-like connecting portion extended in the Y-axis direction in FIG. 9. The plurality of unit electrode bodies 32a and the plurality of unit electrode bodies 33a are arranged alternately in the Y-axis direction. In a plan view of the plurality of sensing units 30SE from the Z-axis direction, the plurality of sensing units 30SE is one-dimensionally arranged to form a line at equal intervals in the X-axis direction.

Furthermore, as illustrated in FIG. 10, the temperature detection sensing unit 30SEA of the sensor electrode unit 30 includes the pulse electrode 32A and the sense electrodes 33A and 33B provided on the other main surface of the base 31 having flexibility. The pulse electrode 32A and the sense electrodes 33A and 33B extend in the X-axis direction, and the pulse electrode 32A is arranged between the two sense electrodes 33A and 33B. A GND line 38A and a shield 38B to be connected to a reference electrode layer are formed on the other main surface of the base 31.

The base 31 is a substrate containing a polymer resin and having flexibility. Specifically, examples of the polymer resin include polyethylene terephthalate (PET), polyethylene naphthalate (PEN), polycarbonate (PC), acrylic resin (PMMA), polyimide (PI), triacetyl cellulose (TAC), polyester, polyamide (PA), aramid, polyethylene (PE), polyacrylate, polyether sulfone, polysulfone, polypropylene (PP), diacetyl cellulose, polyvinyl chloride, epoxy resin, urea resin, urethane resin, melamine resin, cycloolefin polymer (COP), norbornene thermoplastic resin, or the like.

As described above, the temperature detection sensing unit 30SEA has a structure in which the lower side electrodes (the pulse electrode 32A and the sense electrode 33B) are covered by the sense electrode 33A positioned on the upper side (operation side). Thus, even if a reference electrode layer 21b as described later approaches, capacitances of the pulse electrode 32A and the sense electrode 33B do not change. In other words, the temperature detection sensing unit 30SEA does not have sensitivity to pressing, so that it can be used as a temperature detection sensor.

(Electrode Base)

The electrode bases 21 and 22 are electrode films having flexibility. The electrode base 21 constitutes the sensing surface 20S of the sensor 20, and the electrode base 22 constitutes the back surface of the sensor 20.

The electrode base 21 includes a base 21a having flexibility, and a reference electrode layer (hereinafter referred to as "REF electrode layer") 21b provided on one main surface of the base 21a. The electrode base 21 is arranged on a side of one main surface of the sensor electrode unit 30 such that the REF electrode layer 21b faces the one main surface of the sensor electrode unit 30. The electrode base 22 includes a base 22a having flexibility, and a REF electrode layer 22b provided on one main surface of the base 22a. The electrode base 22 is arranged on a side of the other main surface of the sensor electrode unit 30 such that the REF electrode layer 22b faces the other main surface of the sensor electrode unit 30.

The bases 21a and 22a each have a film-like shape. As a material of the bases 21a and 22a, a polymer resin similar to the base 31 described above is exemplified. The REF electrode layers 21b and 22b each are a so-called ground electrode and have a ground potential. Examples of the shape of each of the REF electrode layers 21b and 22b include a thin film shape, a foil shape, a mesh shape, and the like; however, the shape is not limited thereto.

The REF electrode layers 21b and 22b are only required to have electrical conductivity, and for example, layers can be used such as an inorganic conductive layer containing an inorganic conductive material, an organic conductive layer containing an organic conductive material, and an organic-inorganic conductive layer containing both the inorganic conductive material and the organic conductive material. The inorganic conductive material and the organic conductive material may be particles.

Examples of the inorganic conductive material include metal, metal oxide, and the like. Here, the metal is defined as including semimetal. Examples of the metal include metals such as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead, alloys thereof, or the like; however, the metal is not limited thereto. Examples of the metal oxide include indium tin oxide (ITO), zinc oxide, indium oxide, antimony added tin oxide, fluorine added tin oxide, aluminum added zinc oxide, gallium added zinc oxide, silicon doped zinc oxide, zinc oxide-tin oxide type, indium oxide-tin oxide type, zinc oxide-indium oxide-magnesium oxide type, and the like; however, the metal oxide is not limited thereto.

Examples of the organic conductive material include a carbon material, a conductive polymer, and the like. Examples of the carbon material include carbon black, carbon fiber, fullerene, graphene, carbon nanotube, carbon microcoil, nanohorns, and the like; however, the carbon material is not limited thereto. As the conductive polymer, for example, it is possible to use a substituted or unsubstituted polyaniline, polypyrrole, polythiophene, a polymer (copolymer) including one or two selected from these, and the like; however, the conductive polymer is not limited thereto.

The REF electrode layers 21b and 22b may be thin films prepared by any of a dry process and a wet process. As the dry process, for example, a sputtering method, a vapor deposition method, or the like can be used; however, the dry process is not particularly limited thereto.

The electrode bases 21 and 22 are respectively provided on both main surface sides of the sensor electrode unit 30, whereby external noise (external electric field) can be suppressed from entering the sensor electrode unit 30 from both main surface sides of the sensor 20. Thus, it is possible to suppress an erroneous detection or a decrease in detection accuracy of the sensor 20 due to external noise.

(First and Second Deformation Layers)

The first deformation layer 28 is a film that is elastically deformed by pressure applied to the side wall portions 11R and 11L. In the electronic device 10, the first deformation layers 28 and 28 that are soft and elastically deformable are respectively sandwiched between the sensing surfaces 20S and the inner side surfaces 11SR and 11SL, whereby the dynamic range is improved in the load sensitivity of the sensor 20.

The first deformation layer 28 may be contiguously provided to fill the entire sensing surface 20S. Examples of the shape pattern include, for example, a stripe, mesh, radial, geometric pattern, meander, concentric, spiral, spider web, tree, fish bone, ring, lattice, or indefinite shape, but are not limited thereto.

The second deformation layer 23 is a film that is elastically deformed by pressure applied to the sensing surface 20S of the sensor 20. In the sensor 20, the second deformation layer 23 that is soft and elastically deformable is sandwiched between the main surfaces of the sensor electrode unit 30 and the electrode base 21, whereby the sensitivity and the dynamic range are adjusted of the sensor 20. The second deformation layer 23 preferably includes a hole (not illustrated) such as a through hole. It is because load sensitivity can be improved.

The first and second deformation layers 28 and 23 each include a dielectric such as a foamed resin or an insulating elastomer. The foamed resin is one having a so-called sponge structure, and is, for example, at least one of foamed polyurethane, foamed polyethylene, foamed polyolefin, sponge rubber, or the like. The insulating elastomer is, for example, at least one of a silicone elastomer, an acrylic elastomer, a urethane elastomer, a styrene elastomer, or the like. Note that, the first and second deformation layers 28 and 23 may be provided on a base (not illustrated).

The second deformation layer 24 includes an adhesive having insulation or a double-sided adhesive tape. As the adhesive, for example, one or more can be used selected from a group consisting of an acrylic adhesive, a silicone adhesive, a urethane adhesive, and the like. Here, pressure sensitive adhesion is defined as a type of adhesion. According to this definition, a pressure sensitive adhesive layer is considered as a kind of an adhesive layer. The second deformation layer 24 includes an adhesive or a double-sided adhesive tape; however, the second deformation layer 24 is thicker than the adhesive layers 25 to 27, so that it functions as a good second deformation layer. Note that, the second deformation layer 24 may include a material similar to that of the second deformation layer 23.

(Adhesive Layer)

The adhesive layers 25 to 27 each include, for example, an adhesive having insulation or a double-sided adhesive tape. As an adhesive, one can be exemplified similar to the adhesive of the second deformation layer 24 described above.

(One Example of Method of Manufacturing Temperature Detection Sensing Unit)

Next, with reference to FIGS. 11A and 11B, an example will be described of a method of manufacturing the temperature detection sensing unit 30SEA described above. As illustrated in FIG. 11, the first adhesive layer 300A and the third adhesive layer 301A are respectively formed on both surfaces of the base 31. The sense electrode 33B is formed on the first adhesive layer 300A by transfer or the like. Furthermore, the pulse electrode 32A and the two sense electrodes 33A are formed on the third adhesive layer 301A by transfer or the like.

The second adhesive layer 300B is formed on the back surface of the base agent 31A. This configuration functions as a cover layer. Furthermore, the fourth adhesive layer 301B is formed on the front surface of the base agent 31B. This configuration also functions as a cover layer. Configurations illustrated in FIG. 11A are integrated together as illustrated in FIG. 11B by, for example, thermocompression bonding. Note that, although only the vicinity of the temperature detection sensing unit 30SEA is illustrated in FIG. 11, other configurations may be integrally manufactured at the time of manufacturing the temperature detection sensing unit 30SEA.

[Circuit Configuration of Electronic Device]

Figure 12:
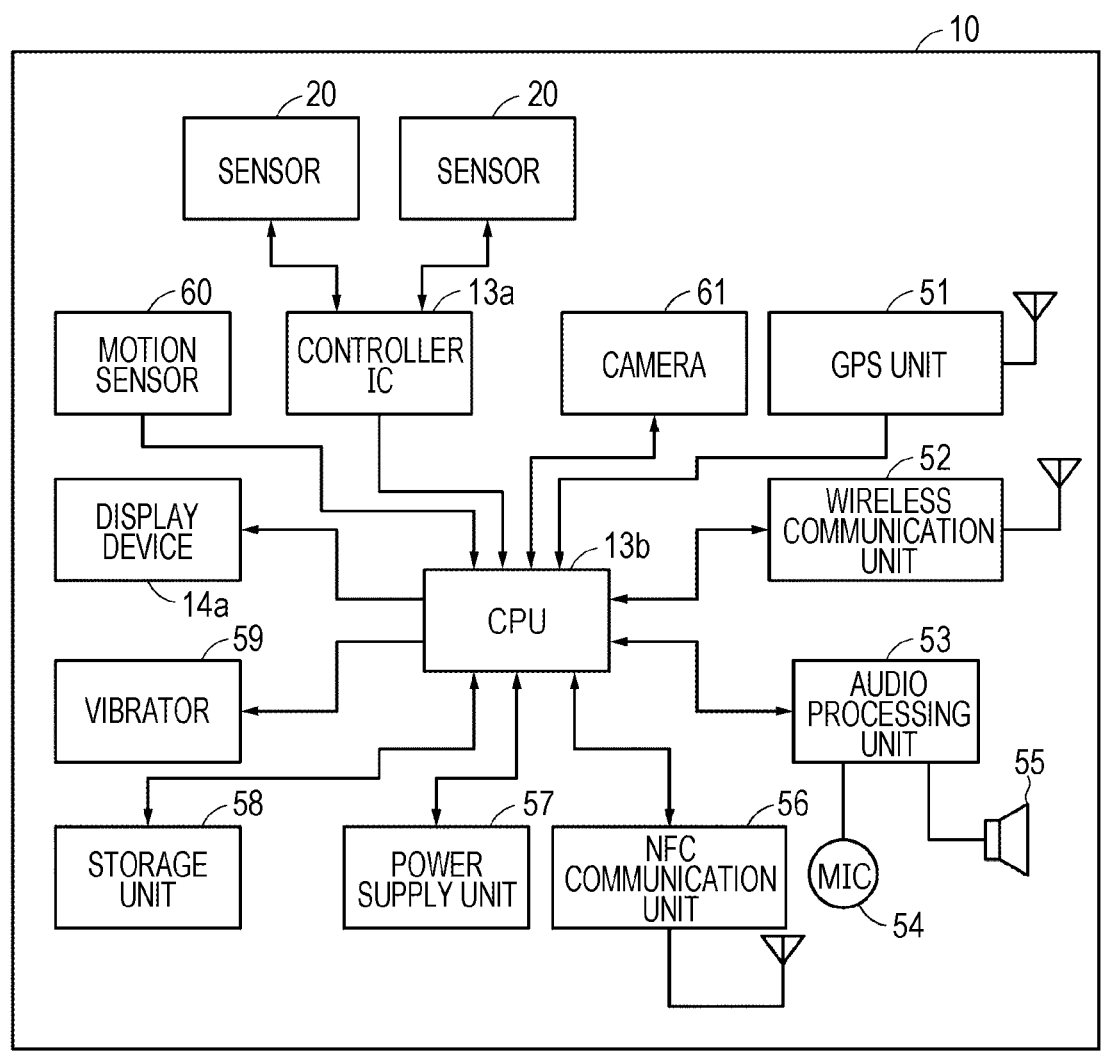
FIG. 12 is a block diagram illustrating a circuit configuration example of the electronic device according to the embodiment of the present technology.

As illustrated in FIG. 12, the electronic device 10 includes the two sensors 20, the CPU 13*b*, the controller IC 13*a*, a GPS unit 51, a wireless communication unit 52, an audio processing unit 53, a microphone 54, a speaker 55, an NFC communication unit 56, a power supply unit 57, a storage unit 58, a vibrator 59, the display device 14*a*, a motion sensor 60, and a camera 61.

The GPS unit 51 is a positioning unit that receives radio waves from satellites of a system called a Global Positioning System (GPS) and measures a current position. The wireless communication unit 52 performs short-range wireless communication with another terminal according to the Bluetooth (registered trademark) standard, for example. The NFC communication unit 56 performs wireless communication with a reader/writer in proximity according to the Near Field Communication (NFC) standard. The data obtained by the GPS unit 51, the wireless communication unit 52, and the NFC communication unit 56 are supplied to the CPU 13*b*.

The microphone 54 and the speaker 55 are connected to the audio processing unit 53, and the audio processing unit 53 performs processing of a call with a party connected by wireless communication in the wireless communication unit 52. Furthermore, the audio processing unit 53 can also perform processing for audio input operation.

The power supply unit 57 supplies power to the CPU 13*b*, the display device 14*a*, and the like included in the electronic device 10. The power supply unit 57 includes a secondary battery such as a lithium ion secondary battery, a charge and discharge control circuit that controls charging and discharging of the secondary battery, and the like. Note that, although not illustrated in FIG. 8, the electronic device 10 includes a terminal for charging the secondary battery.

The storage unit 58 is a random access memory (RAM) or the like, and stores various data such as an operating system (OS), an application, a moving image, an image, music, and a document.

The vibrator 59 is a member that vibrates the electronic device 10. For example, the electronic device 10 vibrates the electronic device 10 with the vibrator 59, to perform notification of an incoming call, reception of an e-mail, or the like.

The display device 14*a* displays various screens on the basis of a video signal or the like supplied from the CPU 13*b*. Furthermore, a signal depending on touch operation on the display surface of the display device 14*a* is supplied to the CPU 13*b*.

The motion sensor 60 detects motion of a user holding the electronic device 10. As the motion sensor 60, an acceleration sensor, a gyro sensor, an electronic compass, an atmospheric pressure sensor, or the like is used.

The camera 61 includes a lens group and an imaging element of a complementary metal oxide semiconductor (CMOS) or the like, and captures an image such as a still image or a moving image on the basis of the control of the CPU 13*b*. The captured still image, moving image, and the like are stored in the storage unit 58.

The sensor 20 is a pressure sensor with high sensitivity and high position resolution, detects capacitance depending on pressing operation corresponding to the sensing surface 20S, and outputs an output signal depending on the capacitance to the IC 13*a*.

The IC 13*a* stores firmware for controlling the sensor 20, detects a change in capacitance (pressure) of each sensing unit 30SE of the sensor 20, and outputs a signal depending on the result to the CPU 13*b*.

The CPU 13*b* executes various types of processing based on the signal supplied from the IC 13*a*. Furthermore, the CPU 13*b* processes data supplied from the GPS unit 51, the wireless communication unit 52, the NFC communication unit 56, the motion sensor 60, and the like.

[Each Area of Electronic Device]

Figure 13:
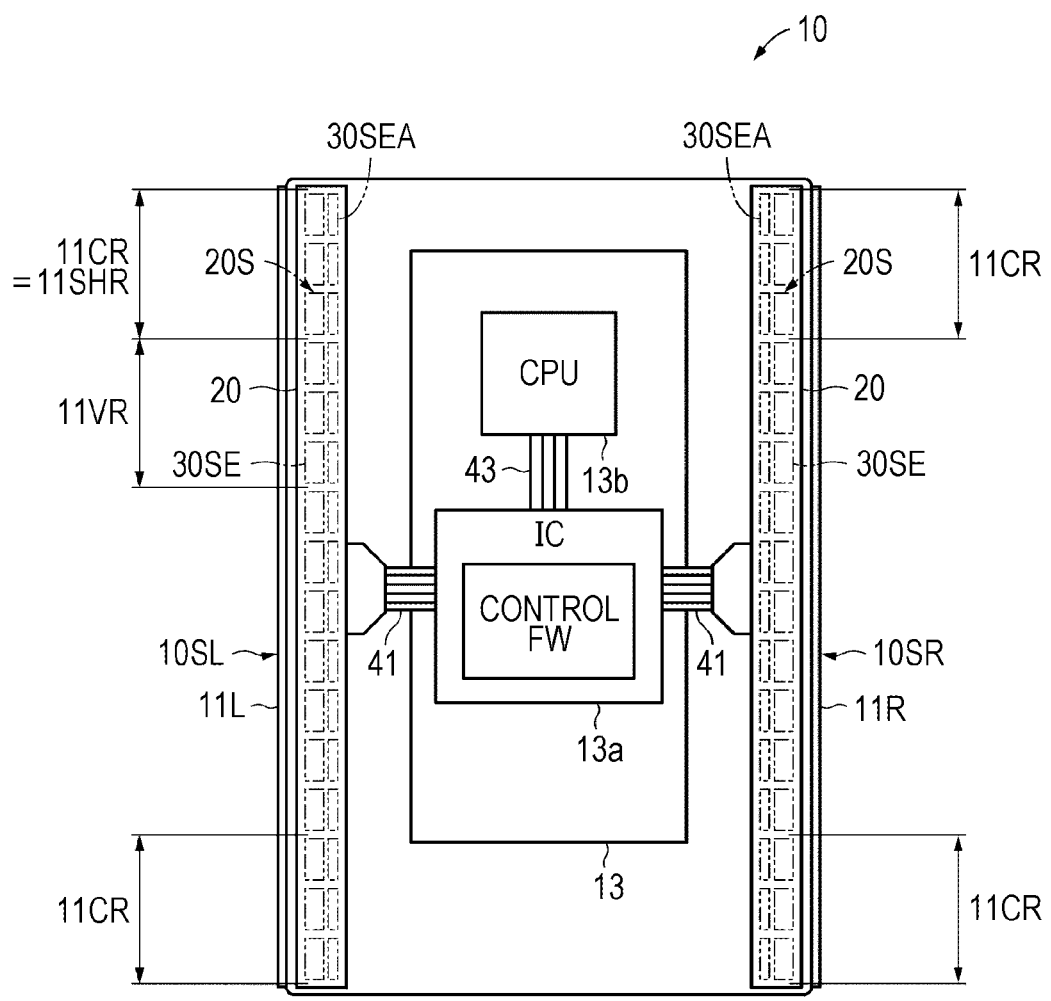
FIG. 13 is a schematic diagram for describing each area of the electronic device according to the embodiment of the present technology.
Figure 14:
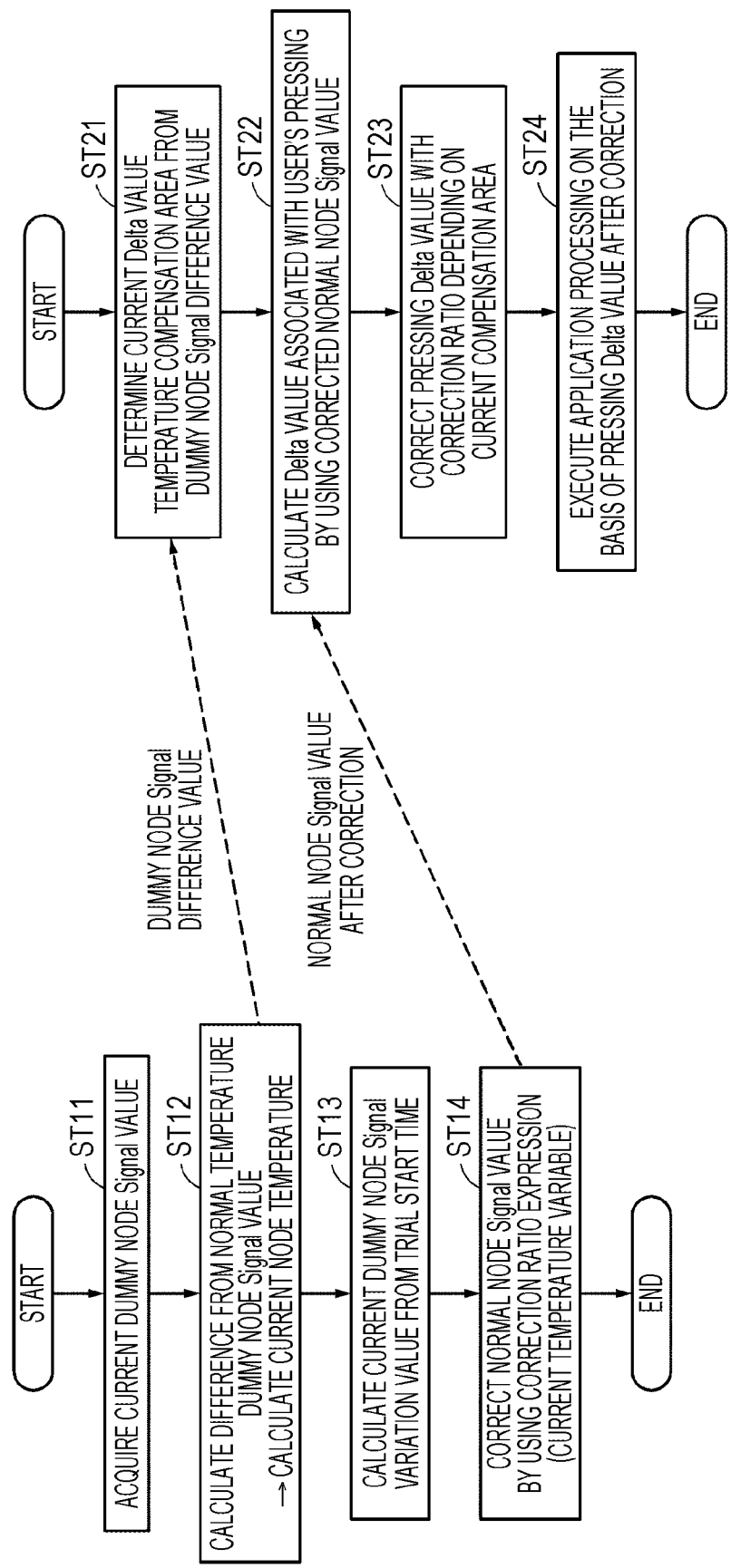
FIG. 14 is a flowchart illustrating an example of processing performed by the sensor according to the embodiment of the present technology.

As illustrated in FIG. 13, the sensor 20 is connected to the IC 13 *a* via the connection unit 41. The IC 13 *a* and the CPU 13 *b* are connected to each other by a bus 43 such as I$^2$C. In FIG. 13, a case is illustrated where the sensor 20 includes 16 sensing units 30SE and temperature detection sensing units 30SEA; however, the number of the sensing units 30SE and the temperature detection sensing units 30SEA is not limited thereto, and can be appropriately set depending on a desired characteristic of the sensor 20. Furthermore, to make the configuration of the sensor 20 easy to understand, the sensing surface 20S is illustrated to be parallel to the XZ plane; however, the sensing surface 20S is actually maintained parallel to the XY plane.

(Volume Adjustment Area)

The electronic device 10 includes, on the side surface 10SR, a volume adjustment area 11VR for adjusting the volume. By sliding the volume adjustment area 11VR with a finger in the upward direction (first direction), the volume can be increased, and by sliding the volume adjustment area 11VR with a finger in the downward direction (second direction), the volume can be decreased. Here, the upward direction means the +X-axis direction, and the downward direction means the −X-axis direction. Note that, the volume adjustment area 11VR is an example of a slide operation area.

Note that, the position of the volume adjustment area 11VR illustrated in FIG. 13 is an example, and the position of the volume adjustment area 11VR is not limited thereto. Furthermore, FIG. 13 illustrates a configuration in which the electronic device 10 includes the volume adjustment area 11VR only on the side surface 10SL; however, the volume adjustment area 11VR may be provided on both the side surfaces 10SR and 10SL.

The volume adjustment area 11VR includes two or more sensing units 30SE. The IC 13a determines whether or not slide operation has been performed in the upward or downward direction on the volume adjustment area 11VR on the basis of a signal supplied from the sensing unit 30SE of the volume adjustment area 11VR. In a case where it is determined that the slide operation has been performed in the upward or downward direction, the IC 13a supplies, to the CPU 13b, a signal notifying that the slide operation is being performed in the upward or downward direction.

(Camera Holding Area)

The electronic device 10 includes camera holding areas 11CR at both ends of each of the side surfaces 10SR and 10SL. When the user holds four camera holding areas 11CR with fingers, a camera application is automatically activated. The camera holding area 11CR includes at least one sensing unit 30SE.

The IC 13a determines whether or not the user is holding the four camera holding areas 11CR with fingers on the basis of a signal supplied from the sensing unit 30SE of each camera holding area 11CR. In a case where it is determined that the four camera holding areas 11CR are being held by the fingers, the IC 13a supplies a signal requesting activation of the camera application to the CPU 13b.

(Shutter Operation Area)

The electronic device 10 includes a shutter operation area 11SHR at one end in the upward direction of the side surface 10SL. Note that, in FIG. 13, a case is illustrated where the shutter operation area 11SHR and one of the four camera holding areas 11CR are the same area; however, the areas may be different from each other.

The IC 13a determines whether or not the shutter operation area 11SHR is pressed by a finger on the basis of a signal supplied from the sensing unit 30SE of the shutter operation area 11SHR. In a case where it is determined that the shutter operation area 11SHR is held by a finger, the IC 13a supplies a signal requesting shutter operation (in other words, image capturing operation) to the CPU 13b.

[Operation of Sensor]

Next, operation will be described of the sensor 20 according to the embodiment of the present technology. When the IC 13a applies a voltage between the pulse electrode 32 and the sense electrode 33, in other words, between sub-electrodes (not illustrated), electric lines of force (capacitive coupling) are formed between the sub electrodes.

When the sensing surface 20S of the sensor 20 is pressed, the second deformation layers 23 and 24 are elastically deformed, and the electrode base 21 bends toward the sensor electrode unit 30, and the sensor electrode unit 30 bends toward the electrode base 22. As a result, the electrode base 21 and the sensor electrode unit 30 approach each other, and the sensor electrode unit 30 and the electrode base 22 approach each other, and part of the electric lines of force between the sub-electrodes flows to the electrode bases 21 and 22, and the capacitance of the sensing unit 30SE changes. The IC 13a detects pressure applied to one main surface of the sensor 20 on the basis of the change in capacitance, and outputs the result to the CPU 13b.

On the other hand, as described above, since the temperature detection sensing unit 30SEA has no sensitivity, it does not respond to pressing. On the basis of temperature information obtained from the Signal value of the temperature detection sensing unit 30SEA, the CPU 13b performs correction processing on sensor information obtained from the sensing unit 30SE.

(Example of Correction Processing)

Here, an example will be described of the correction processing performed by the electronic device 10 with reference to FIGS. 14 to 18. Note that, the correction processing includes, for example, two pieces of processing associated with each other, first correction processing and second correction processing. The first correction processing is processing of correcting the Signal value generated in real time, and the second correction processing is processing of correcting the Delta value depending on a temperature range. Note that, in the following description, each of the sensing units 30SE may be referred to as a normal node or simply a node, and each of the temperature detection sensing units 30SEA may be referred to as a dummy node.

Figure 15:
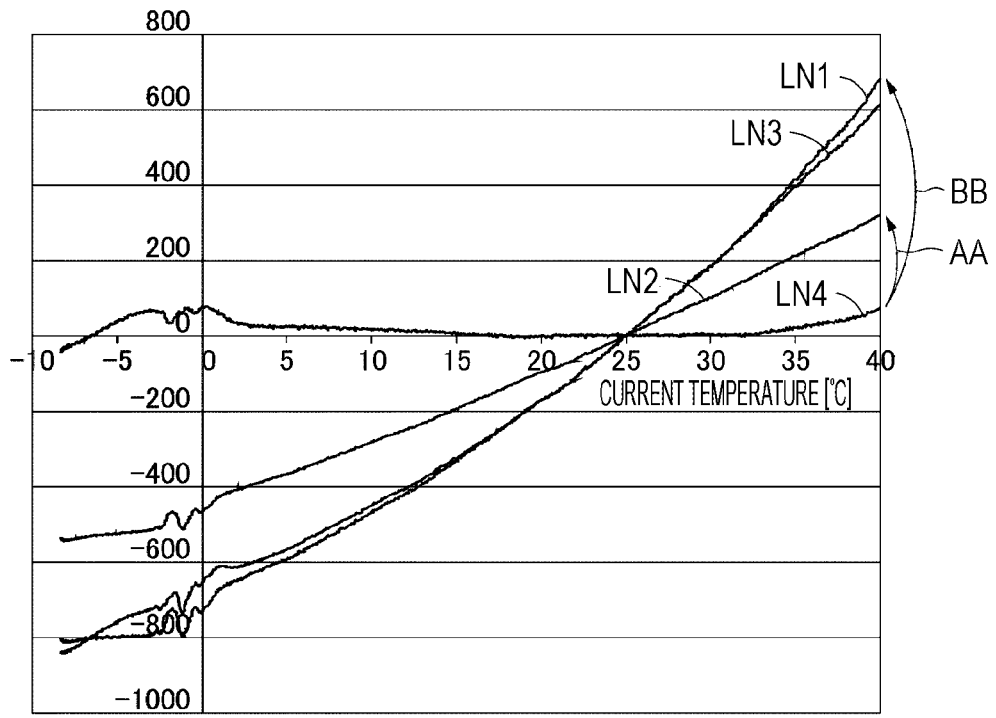
FIG. 15 is a diagram for describing the example of the processing performed by the sensor according to the embodiment of the present technology.
Figure 16:
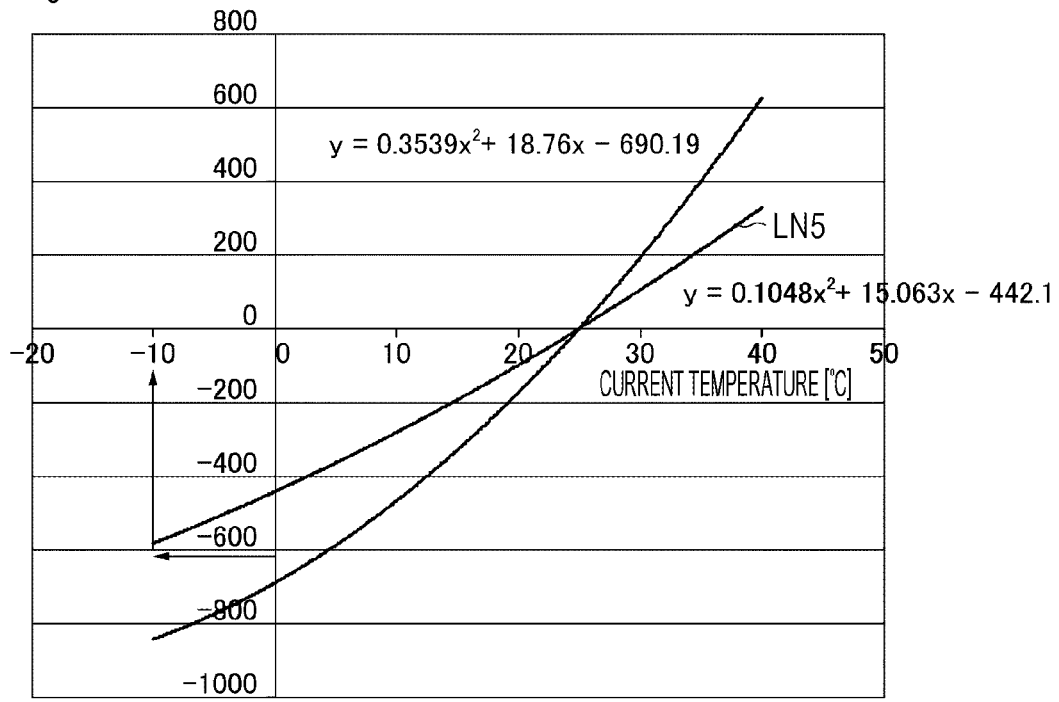
FIG. 16 is a diagram for describing the example of the processing performed by the sensor according to the embodiment of the present technology.
Figure 17:
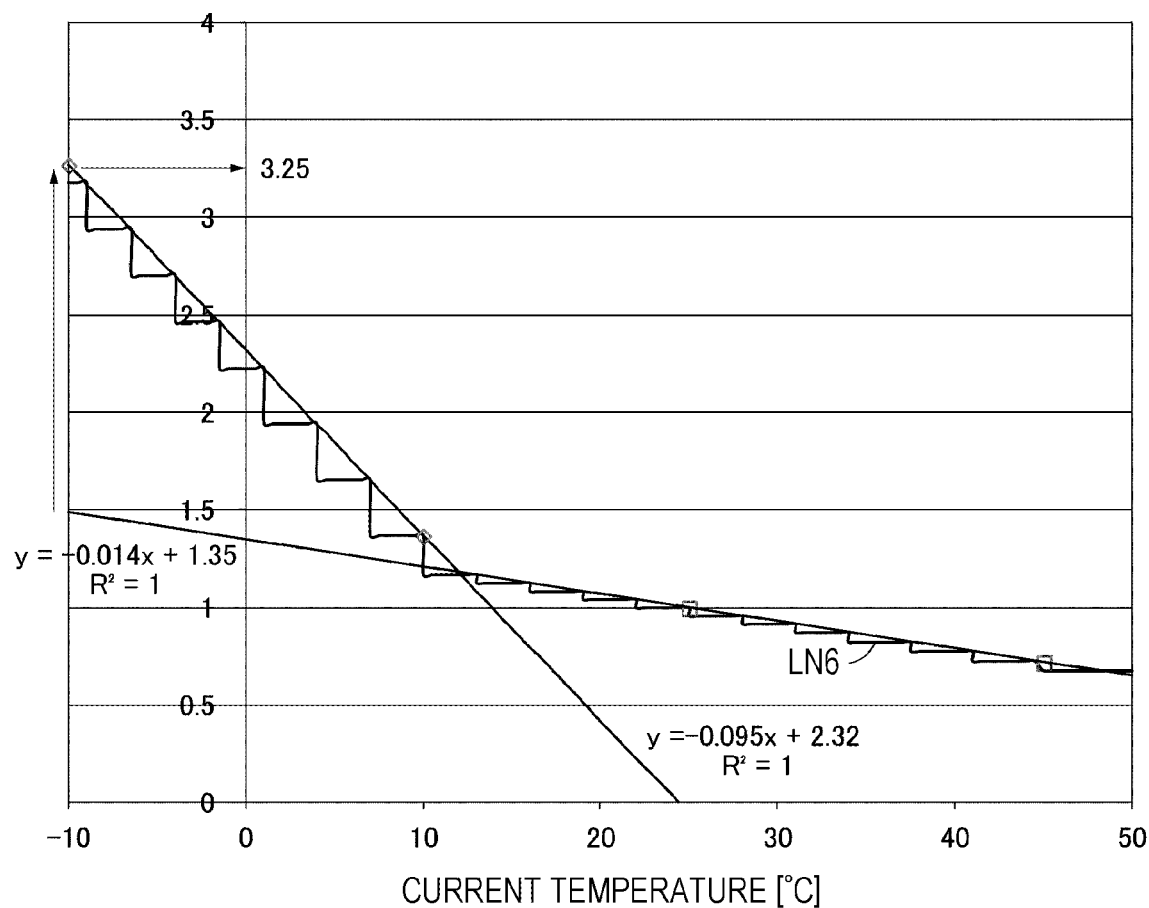
FIG. 17 is a diagram for describing the example of the processing performed by the sensor according to the embodiment of the present technology.
Figure 18:
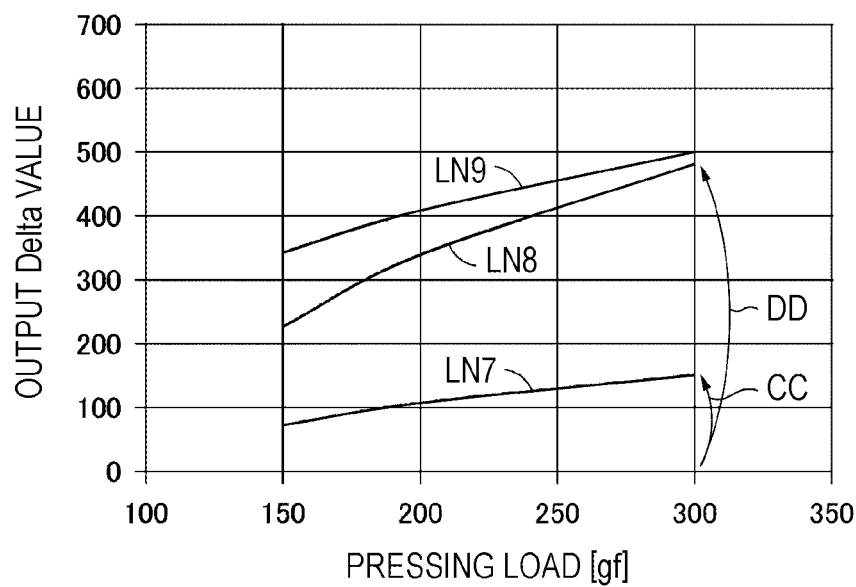
FIG. 18 is a diagram for describing the example of the processing performed by the sensor according to the embodiment of the present technology.

FIG. 15 is a graph for obtaining a correction ratio. The horizontal axis in the graph of FIG. 15 indicates temperature, and the vertical axis is a difference value of the Signal value from the start (for example, 25° C.) corresponding to the temperature. FIG. 16 is a table for obtaining temperature from output of the dummy node, the horizontal axis indicates the temperature, and the vertical axis is a difference value of the Signal value from the start (for example, 25° C.) corresponding to the temperature. FIG. 17 is a table for determining a ratio for correcting the Delta value, the horizontal axis indicates temperature, and the vertical axis indicates a correction ratio of the Delta value corresponding to the temperature. FIG. 18 is a graph illustrating a correction example of the Delta value, the horizontal axis indicates a pressing load (gf), and the vertical axis indicates an output Delta value. Hereinafter, with reference to these graphs, specific correction processing will be described.

In step ST11, a current Signal value is acquired of the dummy node at the time of measurement. Then, the processing proceeds to step ST12.

In step ST12, difference calculation is performed from the Signal value of the normal temperature dummy node, and a current temperature of the node is calculated. As illustrated in FIG. 16, for example, in a case where a Signal difference value from the start temperature 25° C. is −600, the current temperature of the node is calculated as −10° C. on the basis of the temperature curve LN5. Then, the processing proceeds to step ST13.

In step ST13, processing is performed to calculate a current Signal variation value of the dummy node from the trial start time. The Signal variation value of the dummy node is indicated by a line LN2 in FIG. 15. Then, the processing proceeds to step ST14.

In step ST14, processing is performed of obtaining a correction ratio of the Signal variation value (hereinafter, abbreviated as a correction ratio, as appropriate). The correction ratio is a ratio (BB/AA) between a Signal variation value AA of the dummy node (a value illustrated by the line LN2 in FIG. 15) and a Signal variation value BB of the normal node before correction corresponding to a certain temperature (a value illustrated by a line LN1 in FIG. 15), and is represented by a linear expression y=α*Temp+β with a current temperature as a variable. A Signal correction value is obtained by multiplying the Signal variation value of the dummy node from the start temperature by the correction ratio. In FIG. 15, the Signal correction value is indicated by a line LN3. Then, the Signal value of the normal node is corrected by subtracting the Signal correction value from the Signal variation value of the normal node. In FIG. 15, a Signal variation value after correction is indicated by a line LN4. As indicated in the line LN4, variation of the Signal value of the normal node can be suppressed.

Next, the second correction processing will be described. In step ST21, using the processing result in step ST12 of the first correction processing, an area for compensating for a current Delta value is determined from the Signal difference value of the dummy node. Then, the processing proceeds to step ST22.

In step ST22, using the processing result in step ST14, by using the Signal value of the normal node corrected in step ST14, a Delta value associated with the user's pressing is calculated. Then, the processing proceeds to step ST23.

In step ST23, processing is performed of obtaining a correction ratio depending on a compensation area. For example, the table (line LN6) illustrated in FIG. 17 is referred to, and a correction ratio 3.25 is obtained corresponding to a current temperature of the compensation area (for example, −10° C. in this example). Then, the Delta value is corrected by multiplying the Delta value by the correction ratio. For example, as illustrated in FIG. 18, the Delta value is corrected by multiplying an uncorrected Delta value (indicated by a reference sign CC in FIG. 18) corresponding to a load (for example, 300 gf) associated with the pressing by 3.25. In FIG. 18, a Delta value after correction is indicated by a reference sign DD. Note that, a line LN9 indicates a change in the Delta value associated with the pressing load at normal temperature (for example, 25° C.) The Delta value after correction approximates the change in the Delta value at normal temperature.

Effect Example

With the temperature detection sensing unit 30SEA according to the present embodiment, the amount of change can be increased in the Signal value with respect to the temperature. Thus, the temperature can be accurately detected depending on the Signal value of the temperature detection sensing unit 30SEA. An example of the effect will be specifically described.

Figure 19:
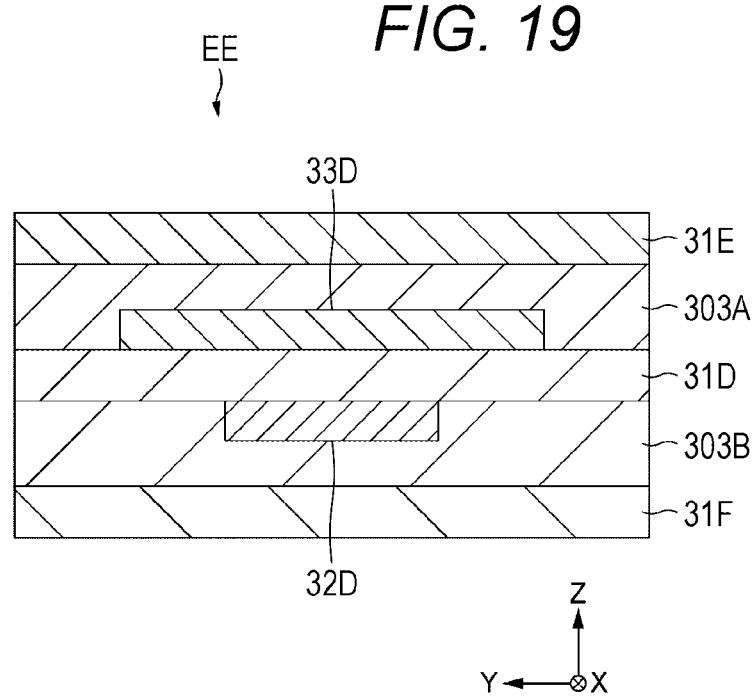
FIG. 19 is a cross-sectional view illustrating a configuration example of another sensor as a contrast in describing an effect of the embodiment of the present technology.

FIG. 19 illustrates a configuration of a temperature detection sensing unit EE to be compared. The temperature detection sensing unit EE has a double-sided FPC configuration. Specifically, the temperature detection sensing unit EE is provided with a sense electrode 33D on the front surface of a base 31D, and a pulse electrode 32D on the back surface. Furthermore, a base 31E is provided on the front surface side of the base 31D with an adhesive layer 303A interposed therebetween, and a base 31F is provided on the back surface side of the base 31D with an adhesive layer 303B interposed therebetween.

Figure 20:
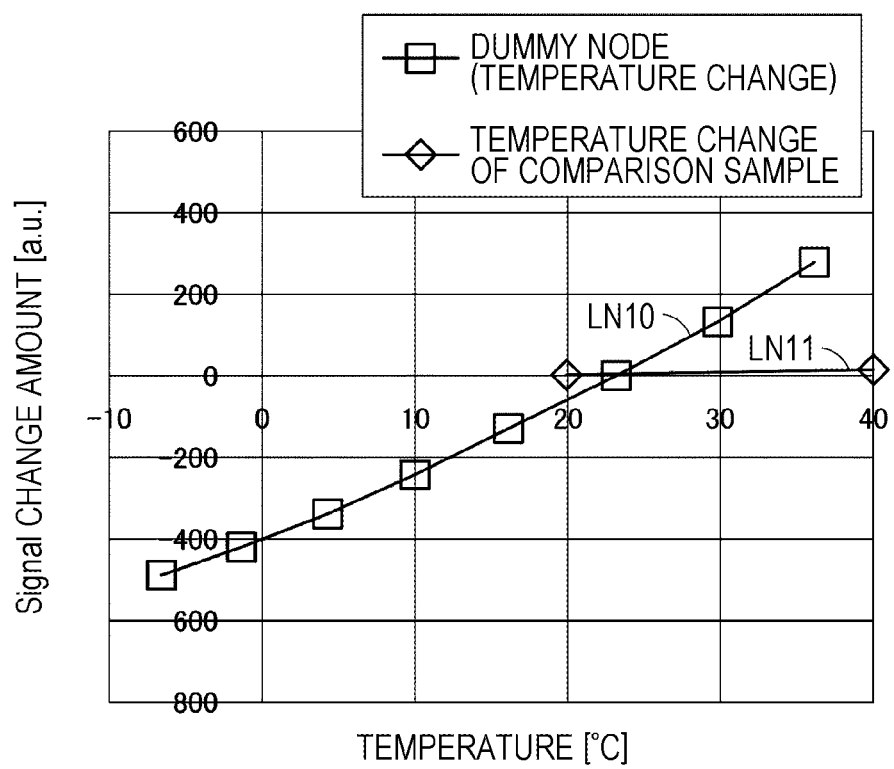
FIG. 20 is a diagram for describing the effect of the embodiment of the present technology.

FIG. 20 is a graph for describing an effect example. The horizontal axis in the graph of FIG. 20 indicates temperature, and the vertical axis indicates the amount of change in the Signal value. Furthermore, a line LN10 in the graph of FIG. 20 indicates the amount of change in the Signal value with respect to the temperature of the temperature detection sensing unit 30SEA, and a line LN11 indicates the amount of change in the Signal value with respect to the temperature of the temperature detection sensing unit EE. As illustrated, although the amount of change in the Signal value with respect to the temperature of the temperature detection sensing unit EE is substantially zero, the amount of change becomes large in the Signal value with respect to the temperature of the temperature detection sensing unit 30SEA according to the embodiment.

(Operation of Electronic Device Corresponding to Various Types of Operation)

Next, operation of the electronic device 10 will be sequentially described in (1) wake-up operation, (2) slide operation, (3) automatic start-up operation of camera application, and (4) right hand/left hand detection function. Note that, the correction processing described above is appropriately performed in each type of operation.

(1) Wake-Up Operation

In the wake-up operation, when the electronic device 10 is gripped in which the CPU 13b is in a sleeping mode, the CPU 13b returns from the sleeping mode and drives the display device 14a. A specific example of the wake-up operation includes an example in which the user takes up the electronic device 10 that is in the sleeping mode and placed on the desk, and grips the electronic device 10, and then the screen of the display device 14a is displayed.

Figure 21:
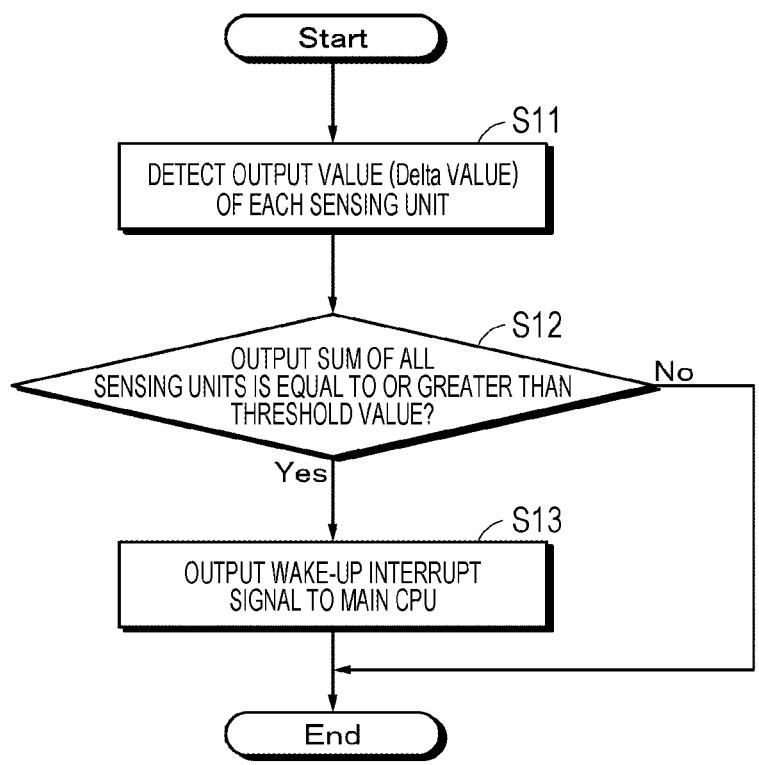
FIG. 21 is a flowchart for describing operation of the electronic device at the time of wake-up operation.

Hereinafter, with reference to FIG. 21, the operation will be described of the electronic device 10 at the time of the wake-up operation. Here, it is assumed that the CPU 13b is in the sleeping mode before step S11, and processing illustrated in FIG. 21 is executed, for example, in one frame. Note that, the frame means a series of processing steps or a period for the processing steps in which the IC 13a performs scan operation on the sensor 20 connected, obtains a pressure distribution (capacitance distribution) through signal processing, interprets input operation performed by the user on the basis of the result (and, in some case, time-series pressure distribution changes between multiple past frames), and outputs the user's input operation content to an upper control unit (here, the CPU 13b) as needed. Usually, the IC 13a interprets the user's input operation by repeating this frame processing at predetermined constant time intervals, and outputs the input operation to the CPU 13b.

First, in step S11, the IC 13a detects an output value (Delta value) of each sensing unit 30SE. Next, in step S12, the IC 13a determines whether or not a sum of output values of all the sensing units 30SE is greater than or equal to a threshold value.

In a case where it is determined in step S12 that the sum of the output values of all the sensing units 30SE is greater than or equal to the threshold value, the IC 13a outputs a wake-up interrupt signal to the CPU 13b in step S13. The wake-up interrupt signal is a signal for causing the CPU 13b to execute a wake-up function, and when the wake-up interrupt signal is supplied from the IC 13a to the CPU 13b, the CPU 13b wakes up from the sleeping mode and returns to a normal activation state. On the other hand, in a case where it is determined in step S12 that the sum of the output values of all the sensing units 30SE is not greater than or equal to the threshold value, the processing ends.

(2) Slide Operation

The slide operation is operation of adjusting volume of the electronic device 10 by sliding the volume adjustment area 11VR provided on the side surface 10SL in the vertical direction with a finger.

Figure 22:
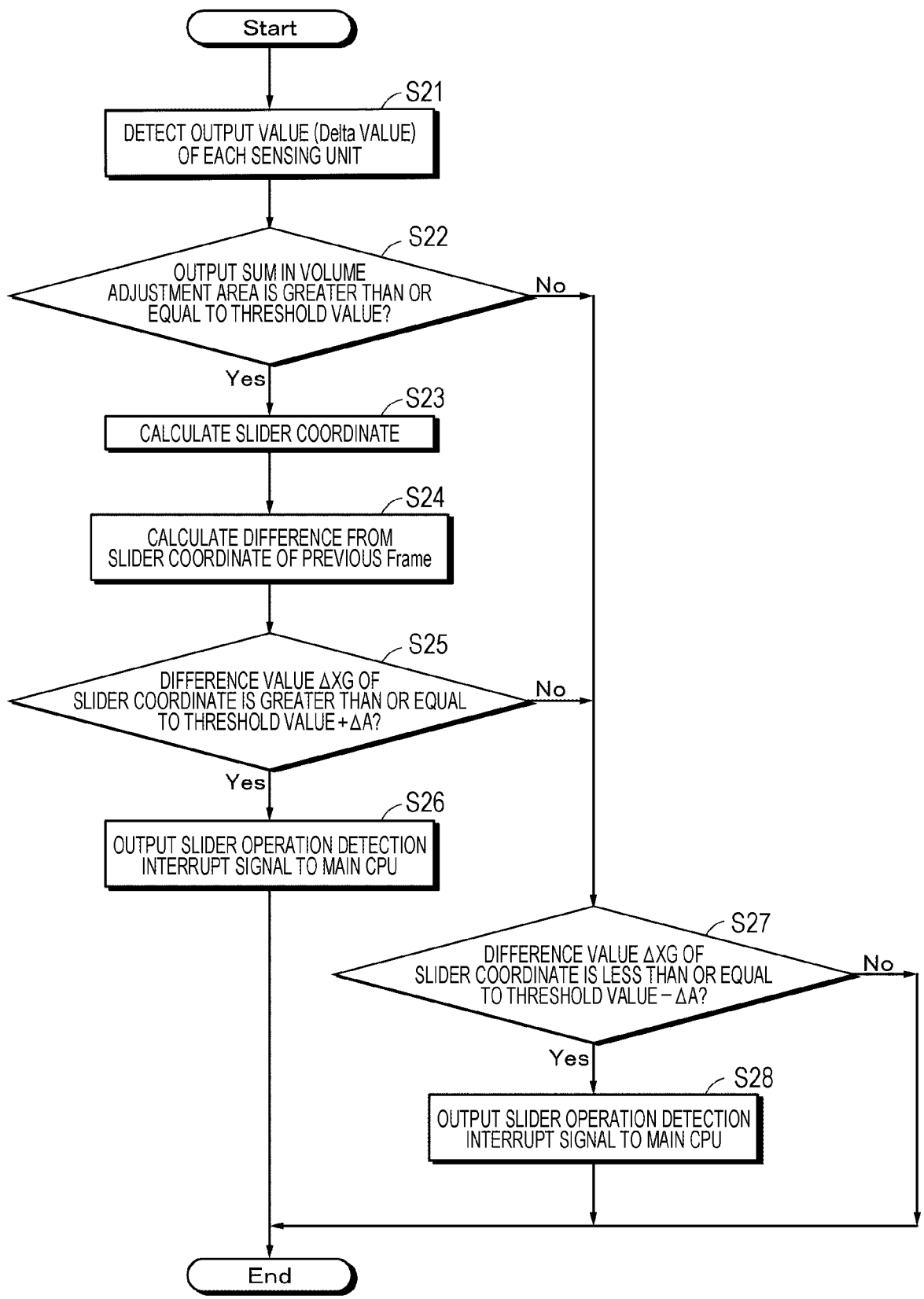
FIG. 22 is a flowchart for describing operation of the electronic device at the time of slide operation.

Hereinafter, with reference to FIG. 22, the operation will be described of the electronic device 10 at the time of the slide operation. Here, the slide operation is operation that can be performed, for example, in a state where a home screen is displayed, and processing illustrated in FIG. 22 is executed, for example, in one frame.

First, in step S21, the IC 13a detects an output value (Delta value) of each sensing unit 30SE. Next, in step S22, the IC 13a determines whether or not a sum of output values of all the sensing units 30SE included in the volume adjustment area 11VR is greater than or equal to a threshold value.

In a case where it is determined in step S22 that the sum of the output values of all the sensing units 30SE included in the volume adjustment area 11VR is greater than or equal to the threshold value, the IC 13a calculates barycentric coordinate $X_G$ (hereinafter referred to as "slider coordinate $X_G$") of the finger sliding, in step S23. Specifically, a centroid value of the output value in each sensing unit 30SE (a plurality of contiguous sensing units 30SE) included in the volume adjustment area 11VR is calculated by using the following expression (1). On the other hand, in a case where it is determined in step S22 that the sum of the output values of all the sensing units 30SE included in the volume adjustment area 11VR is not greater than or equal to the threshold value, the processing ends.

$$x_G = \frac{\sum_{i=1}^{n} m_i x_i}{\sum_{i=1}^{n} m_i}$$ [Expression 1]

(where $m_i$ is an output value (Delta value) of the i-th sensing unit 30SE of the volume adjustment area 11VR, $x_i$ is a position where the i-th sensing unit 30SE of the volume adjustment area 11VR is arranged)

Note that, the sensing unit 30SE's number increases from one end in the longitudinal direction of the side surface 10SL toward the other end (in other words, toward the +X-axis direction). Furthermore, the origin of the coordinate $x_i$ is the center position of the volume adjustment area 11VR in the longitudinal direction of the sensing unit 30SE (in other words, the +X-axis direction).

Next, in step S24, the IC 13a calculates a difference $\Delta X_G$ (=(slider coordinate $X_G$ calculated in the current frame)−(slider coordinate $X_G$ calculated in the previous frame)) between the slider coordinate $X_G$ calculated in the previous frame and the slider coordinate $X_G$ calculated in the current frame. Next, in step S25, the IC 13a determines whether or not the difference value between the slider coordinates $X_G$ is greater than or equal to the threshold value+$\Delta A$.

In a case where it is determined in step S25 that the difference value between the slider coordinates $X_G$ is greater than or equal to the threshold value+$\Delta A$, the IC 13a outputs a slider operation detection interrupt signal to the CPU 13b in step S26.

On the other hand, in a case where it is determined in step S25 that the difference value between the slider coordinates $X_G$ is not greater than or equal to the threshold value+$\Delta A$, the IC 13a determines whether or not the difference value between the slider coordinates $X_G$ is less than or equal to the threshold value−$\Delta A$ in step S27.

In a case where it is determined in step S27 that the difference value between the slider coordinates $X_G$ is less than or equal to the threshold value−$\Delta A$, the IC 13a outputs the slider operation detection interrupt signal to the CPU 13b in step S28. On the other hand, in a case where it is determined in step S27 that the difference value between the slider coordinates $X_G$ is not less than or equal to the threshold value−$\Delta A$, the processing ends.

Here, the slider operation detection interrupt signal is a signal for notifying the CPU 13b of detection of the slide operation and a direction of the slide operation, and when the slider operation detection interrupt signal is supplied from the IC 13a to the CPU 13b, the CPU 13b adjusts the volume depending on the direction of the slide operation. Specifically, the CPU 13b controls volume adjustment to increase the volume in a case where the direction of the slide operation is the upward direction (in other words, in a case where the difference value between the slider coordinates $X_G$ is greater than or equal to the threshold value $\Delta A$). On the other hand, in a case where the direction of the slide operation is the downward direction (in other words, in a case where the difference value between the slider coordinates $X_G$ is less than or equal to the threshold value−$\Delta A$), the volume adjustment is controlled to decrease the volume.

(3) Automatic Start-Up Operation of Camera Application

The automatic start-up operation of the camera application is operation of automatically activating the camera application by the user holding four camera holding areas 11CR provided on the side surfaces 10SR and 10SL with fingers.

Figure 23:
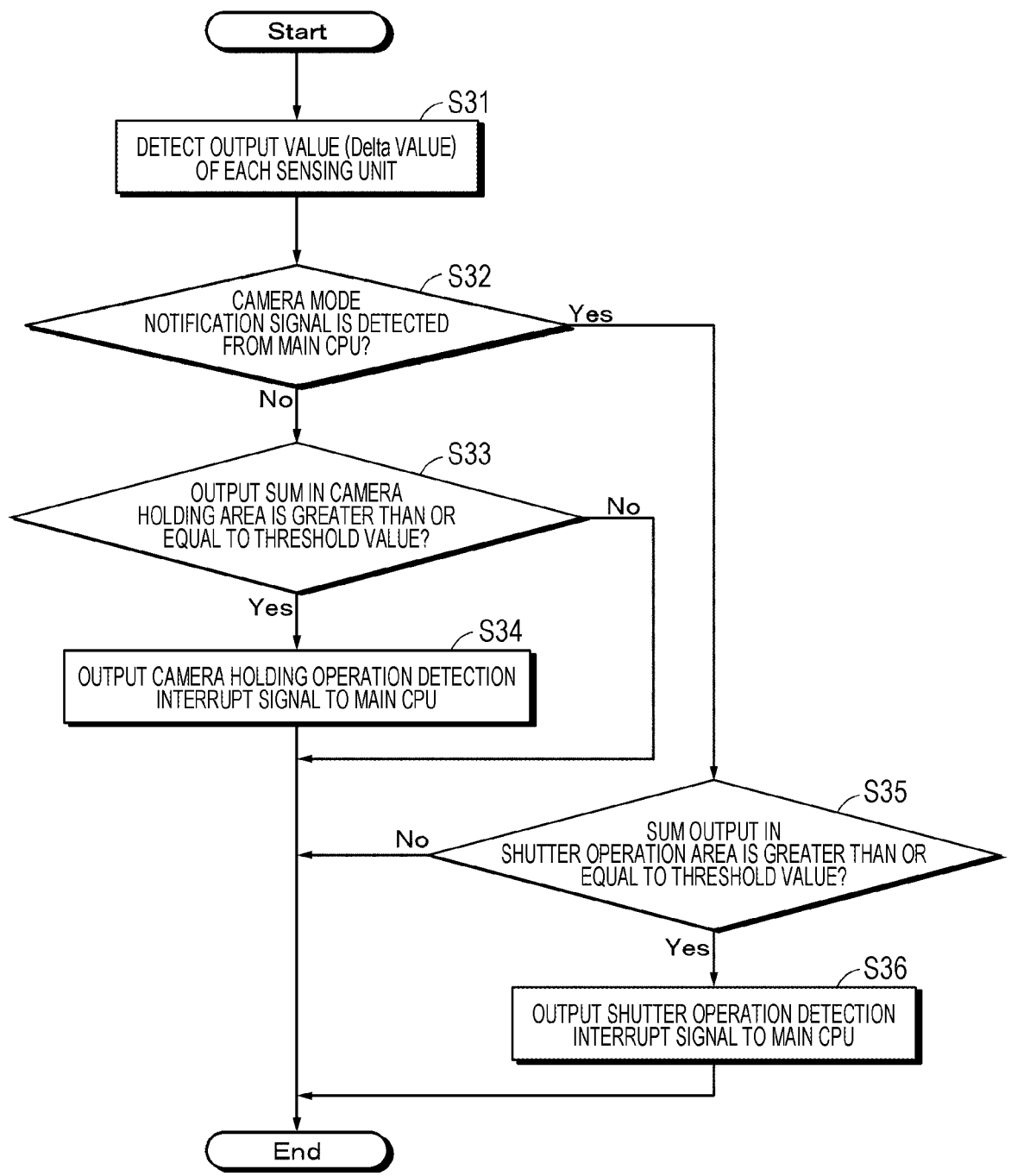
FIG. 23 is a flowchart for describing operation of the electronic device at the time of automatic start-up operation of a camera application.

Hereinafter, with reference to FIG. 23, the operation will be described of the electronic device 10 at the time of the automatic start-up operation of the camera application. Here, the automatic start-up operation of the camera application is operation that can be performed, for example, in a state where the home screen is displayed, and processing illustrated in FIG. 23 is executed, for example, in one frame.

First, in step S31, the IC 13a detects an output value (Delta value) of each sensing unit 30SE. At this time, output values of all the sensing units 30SE of the sensor 20 may be detected, but only output values of the sensing units 30SE included in the four camera holding areas 11CR may be detected.

Next, in step S32, the IC 13a determines whether or not a signal (hereinafter referred to as "camera mode notification signal") for notifying that a camera mode is in progress is supplied from the CPU 13b. In a case where it is determined in step S32 that the camera mode notification signal is not supplied from the CPU 13b, the IC 13a determines whether or not a sum value of outputs of the sensing units 30SE included in the four camera holding areas 11CR is greater than or equal to a threshold value in step S33.

In a case where it is determined in step S33 that the sum value of the outputs of the four camera holding areas 11CR is greater than or equal to the threshold value, the IC 13a outputs a camera holding operation detection interrupt signal to the CPU 13b in step S34. The camera holding operation detection interrupt signal is a signal for notifying the CPU 13b of activation of the camera application, and when the camera holding operation detection interrupt signal is supplied from the IC 13a to the CPU 13b, the CPU 13b activates the camera application. On the other hand, in a case where it is determined in step S33 that the sum value of the outputs of the four camera holding areas 11CR is not greater than or equal to the threshold value, the processing ends.

In a case where it is determined in step S32 that the camera mode notification signal is supplied from the CPU 13*b*, the IC 13*a* determines whether or not the sum value of the outputs of the sensing units 30SE included in the shutter operation area 11SHR is greater than or equal to a threshold value in step S35. Note that, in a case where the number of the sensing units 30SE included in the shutter operation area 11SHR is only one, it is determined whether or not the output of the sensing unit 30SE is greater than or equal to the threshold value.

In a case where it is determined in step S35 that the sum value of the outputs of the sensing units 30SE included in the shutter operation area 11SHR is greater than or equal to the threshold value, the IC 13*a* outputs a shutter operation detection interrupt signal to the CPU 13*b* in step S36. The shutter operation detection interrupt signal is a signal requesting the CPU 13*b* to perform shutter operation (in other words, image capturing operation), and when the shutter operation detection interrupt signal is supplied from the IC 13*a* to the CPU 13*b*, the CPU 13*b* captures an image and stores the image in the storage unit 58. On the other hand, in a case where it is determined in step S35 that the sum value of the outputs of the sensing units 30SE included in the shutter operation area 11SHR is not greater than or equal to the threshold value, the processing ends.

Note that, the electronic device 10 may be configured to be able to perform focus adjustment with the shutter operation area 11SHR. For example, when the shutter operation area 11SHR is pressed halfway, focus adjustment may be performed. Specifically, the IC 13*a* outputs a focus adjustment detection interrupt signal to the CPU 13*b* in a case where it is determined that the sum value of the outputs of the sensing unit 30SE is greater than or equal to a threshold value 1 and less than a threshold value 2. The focus adjustment detection interrupt signal is a signal for requesting the CPU 13*b* to perform focus adjustment of the camera 61, and when the focus adjustment detection interrupt signal is supplied from the IC 13*a* to the CPU 13*b*, the CPU 13*b* adjusts focus of the camera 61. In a case where the IC 13*a* determines that the sum value is greater than or equal to the threshold value 2, the shutter operation detection interrupt signal is output to the CPU 13*b*.

(4) Right Hand/Left Hand Detection Function

The right hand/left hand detection function is a function in which the IC 13*a* determines whether the user holds the electronic device 10 with the right hand or the left hand, and a screen display (for example, application display, operation menu display, or the like) is automatically changed depending on the hand holding the electronic device 10. Specifically, in a case where it is determined that the user holds the electronic device 10 with the right hand, a screen for the right hand is displayed, and in a case where it is determined that the user holds the electronic device 10 with the left hand, a screen for the left hand is displayed.

For example, in the case of the application display, the IC 13*a* automatically changes the screen display as follows. In other words, in a case where it is determined that the electronic device 10 is held by the right hand, the IC 13*a* arranges a menu in a range where the thumb of the right hand easily reaches, or displays the menu by shifting the menu from the center position of the screen to the side surface 10SR side where the thumb of the right hand is positioned so that the thumb of the right hand easily reaches. On the other hand, in a case where it is determined that the electronic device 10 is held by the left hand, the IC 13*a* arranges the menu in a range where the thumb of the left hand easily reaches, or displays the menu by shifting the menu from the center position of the screen to the side surface 10SL side where the thumb of the left hand is positioned so that the thumb of the left hand easily reaches.

Figure 24:
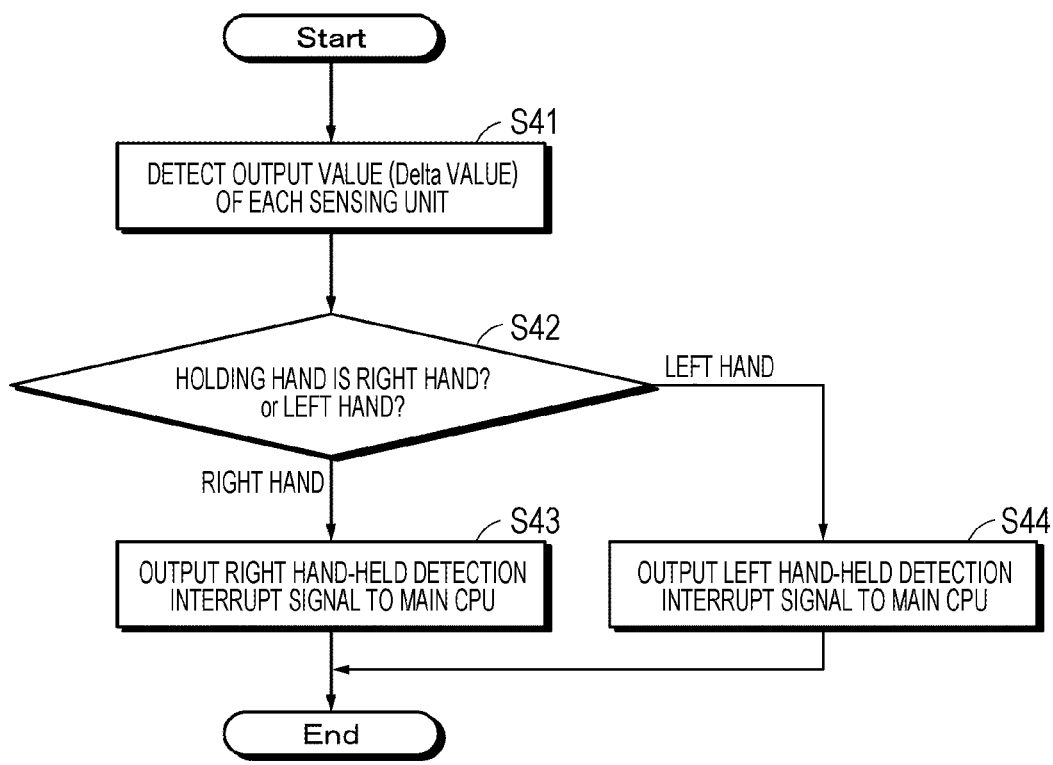
FIG. 24 is a flowchart for describing operation of the electronic device in a right hand/left hand detection function.

Hereinafter, with reference to FIG. 24, the operation will be described of the electronic device 10 in the right hand/left hand detection function. Here, the right hand/left hand detection function is operation that can be performed in a state where the home screen, the menu screen, or the like is displayed, and processing illustrated in FIG. 24 is executed, for example, in one frame.

Figure 25:
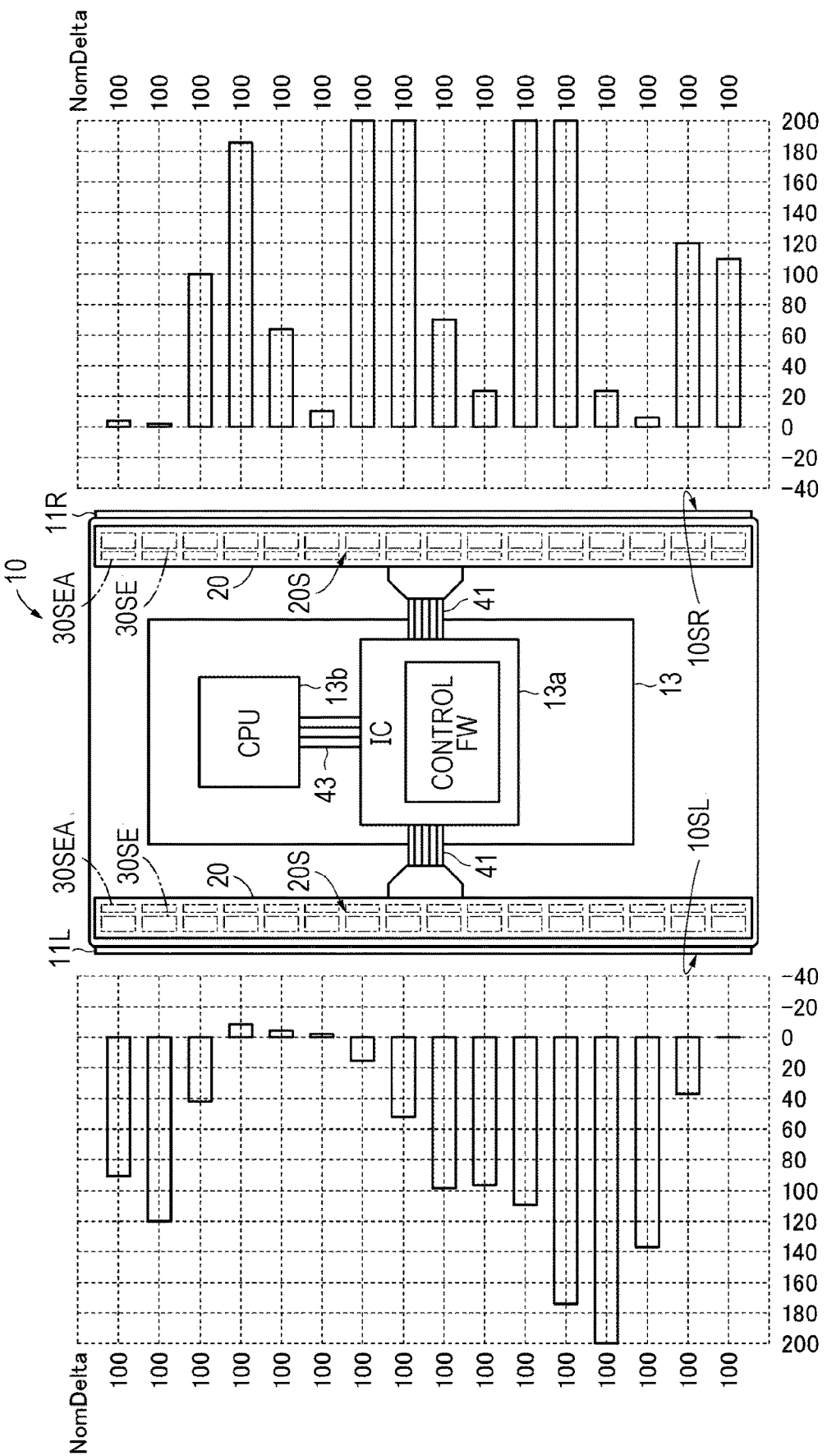
FIG. 25 is a schematic diagram illustrating an example of profiles of output values (Delta values) when a user holds the electronic device with the left hand.

First, in step S41, the IC 13*a* detects an output value (Delta value) of each sensing unit 30SE. Next, in step S42, the IC 13*a* determines whether the user holds the electronic device 10 with the right hand or the left hand on the basis of the output value of each sensing unit 30SE detected in step S41. Specifically, the IC 13*a* determines the user's holding hand from a correlation between profiles of output values (Delta values) output from all the sensing units 30SE and profiles for the right hand and the left hand stored in advance in a memory of the IC 13*a*. FIG. 25 illustrates an example of the profiles of the output values (Delta values) when the user holds the electronic device 10 with the left hand.

In a case where it is determined in step S42 that the user holds the electronic device 10 with the right hand, the IC 13*a* outputs a right hand-held detection interrupt signal to the CPU 13*b* in step S43. The right hand-held detection interrupt signal is a signal requesting the CPU 13*b* to display a right hand-held screen, and when the right hand-held detection interrupt signal is supplied from the IC 13*a* to the CPU 13*b*, the CPU 13*b* displays the right hand-held screen (for example, application display, operation menu display, or the like).

On the other hand, in a case where it is determined in S42 that the user holds the electronic device 10 with the left hand, the IC 13*a* outputs a left hand-held detection interrupt signal to the CPU 13*b* in step S44. The left hand-held detection interrupt signal is a signal requesting the CPU 13*b* to display a left hand-held screen, and when the left hand-held detection interrupt signal is supplied from the IC 13*a* to the CPU 13*b*, the CPU 13*b* displays the left hand-held screen (for example, application display, operation menu display, or the like).

[Modifications]

(Modification of Temperature Detection Sensing Unit)

Figure 26A:
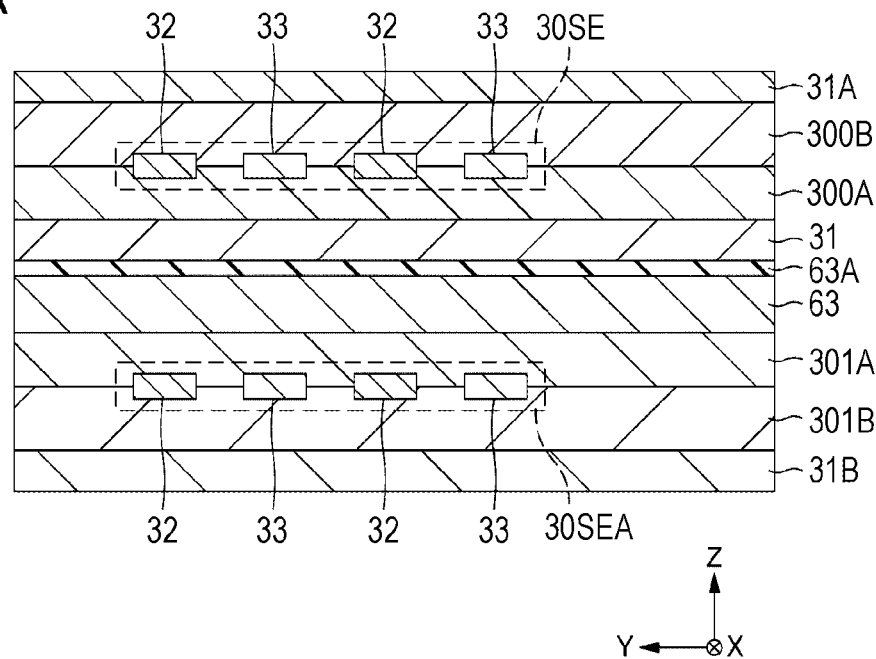
FIGS. 26A and 26B are diagrams for describing modifications.

As illustrated in FIG. 26A, the electrode arrangement of the sensing unit 30SE and the electrode arrangement of the temperature detection sensing unit 30SEA may be the same as each other. In this case, the sensing unit 30SE and the temperature detection sensing unit 30SEA are respectively provided in different layers electrically isolated by a conductive layer, for example, a reference electrode layer (GND layer) 63. The reference electrode layer 63 is provided on the back surface of the base 31 with an adhesive layer 63A interposed therebetween. According to this modification, the areas of the sensing unit 30SE and the temperature detection sensing unit 30SEA can be secured, and an advantage can be obtained of improving the sensitivity.

Figure 26B:
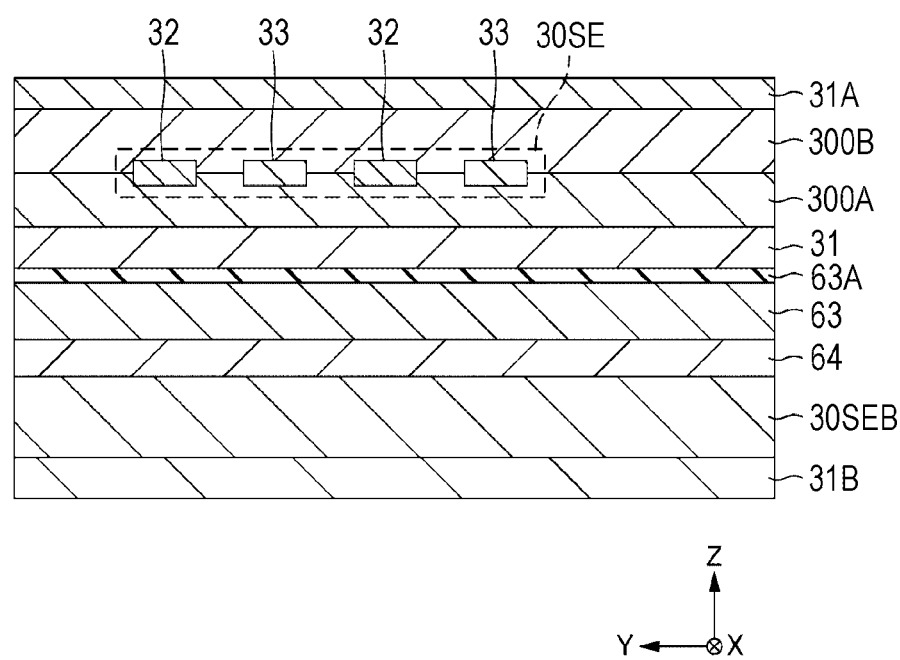

As illustrated in FIG. 26B, in the modification illustrated in FIG. 26A, the temperature detection sensing unit 30SEA does not have to be a capacitance type, and may be a temperature detection sensing unit 30SEB of another type such as a resistance type, provided on the back surface of the reference electrode layer 63 with the adhesive layer 64 interposed therebetween. According to this modification, the area of the sensing unit 30SE can be secured, so that an advantage can be obtained of improving the sensitivity.

Figure 27:
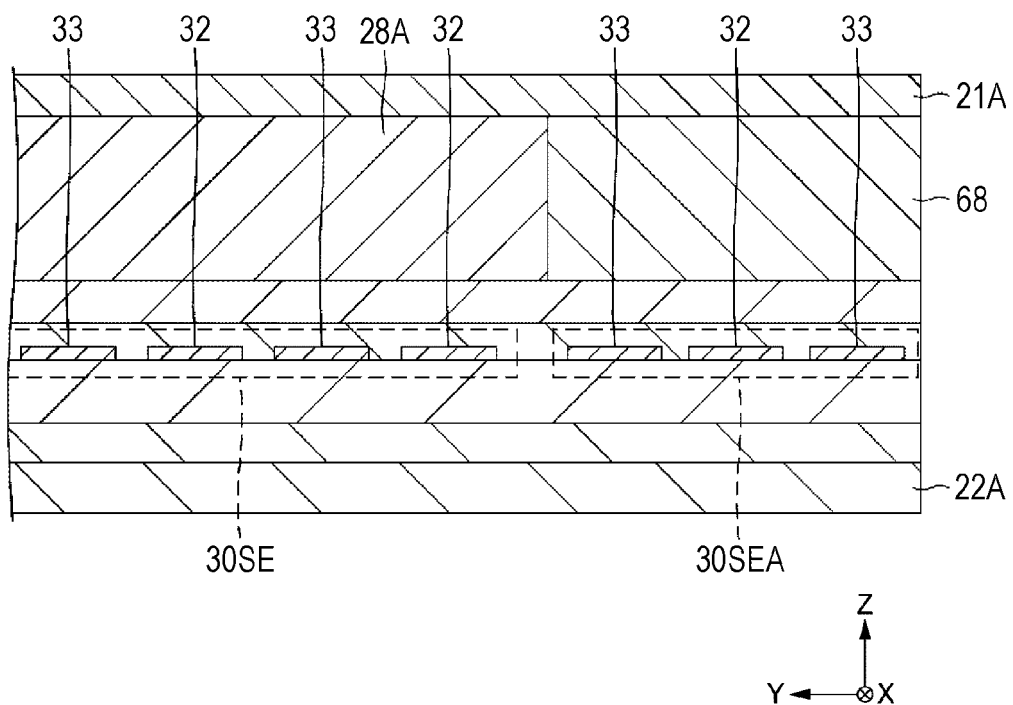
FIG. 27 is a diagram for describing a modification.

The present disclosure can also include a single-sided FPC. For example, as illustrated in FIG. 27, the sense electrode 33 and the pulse electrode 32 are provided on the base 31E. The base 31F is provided on a side of one main surface of the base 31E with the adhesive layer 310 interposed therebetween. A deformation layer 28A that deforms depending on operation is provided on the operation direction side of the sense electrode 33 and the pulse electrode 32 constituting the sensing unit 30SE, and a spacer 68 that is not substantially deformed even when the operation is performed is provided on the operation direction side of the sense electrode 33 and the pulse electrode 32 constituting the temperature detection sensing unit 30SEA. The spacer 68 includes a rigid material (for example, an adhesive) that hardly deforms even when receiving the pressure associated with the operation. Since the spacer 68 is provided on the upper side of the temperature detection sensing unit 30SEA, the temperature detection sensing unit 30SEA can be made not to respond and have no sensitivity even when the operation is performed.

Figure 28A:
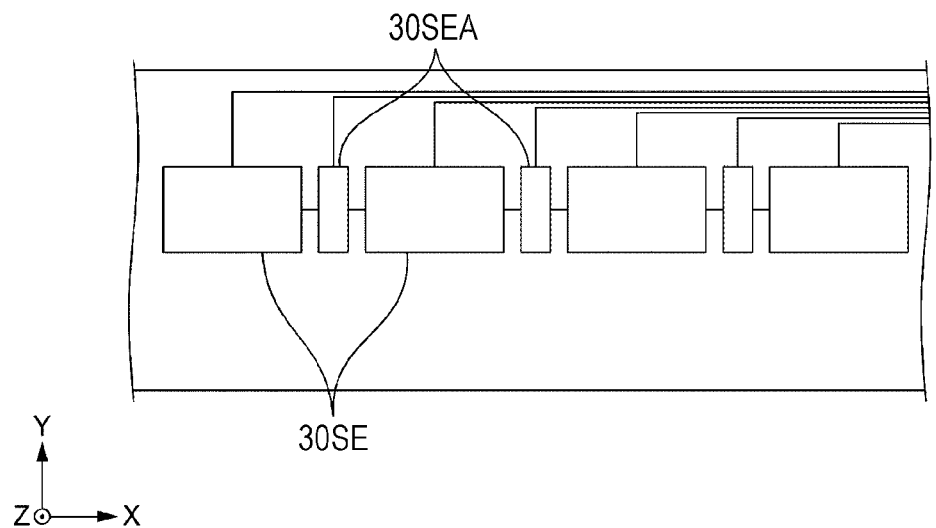
FIGS. 28A and 28B are diagrams for describing modifications.
Figure 28B:
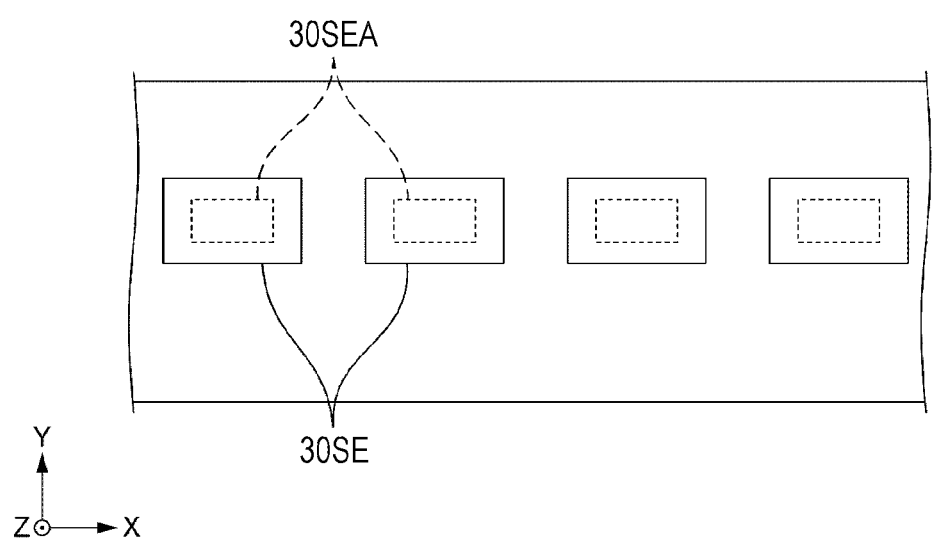

In the embodiment described above, an example has been described in which the sensing unit 30SE and the temperature detection sensing unit 30SEA are arranged on a straight line (horizontally) in the operation direction; however, the pattern of the position in the in-plane position of the base 31 is not limited thereto. For example, as illustrated in FIG. 28A, the sensing units 30SE and the temperature detection sensing units 30SEA may be alternately arranged in the X-axis direction of the base 31. Furthermore, as illustrated in FIG. 28B, the sensing unit 30SE and the temperature detection sensing unit 30SEA may be respectively provided in different layers, and the sensing units may be provided to overlap each other in the thickness direction of the sensor electrode unit 30. For example, the sensor centers of gravity of the sensing units may be arranged at the same position. According to this configuration, the sensing positions of the sensing units are the same as each other, so that a deviation of a correction value can be reduced. Furthermore, one temperature detection sensing unit 30SEA may be provided for the plurality of sensing units 30SE.

Figure 29A:
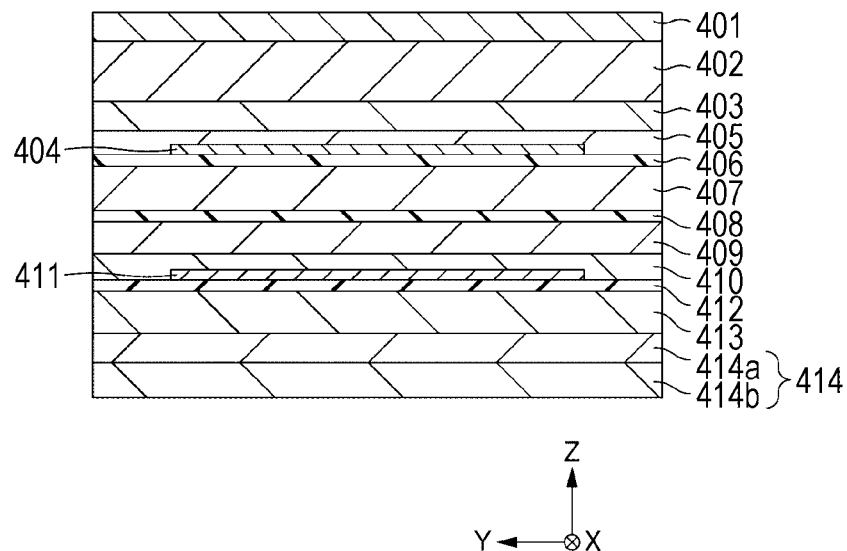
FIGS. 29A and 29B are diagrams for describing modifications.

The present technology can also be applied to a self-capacitance type sensor. FIG. 29A illustrates a configuration example of a sensor in which the present technology is applied to a self-capacitance type sensor. A base 403 and a base 407 are attached with an adhesive layer 405 and an adhesive layer 406 interposed therebetween, and an electrode 404 of a self-capacitance type is arranged in an adhesive layer including the adhesive layer 405 and the adhesive layer 406. A deformation layer 402 is provided on one main surface (main surface on the operation direction side) of the base 403 with an adhesive layer (not illustrated) interposed therebetween, and a reference electrode layer 401 is provided on one main surface of the deformation layer 402. A reference electrode layer 409 is provided on the back surface side of the base 407 with an adhesive layer 408 interposed therebetween. The reference electrode layer 409 and a base 413 are attached with an adhesive layer 410 and an adhesive layer 412 interposed therebetween, and an electrode 411 of a self-capacitance type is arranged in an adhesive layer including the adhesive layer 410 and the adhesive layer 412. An electrode base 414 including a base 414a and a reference electrode layer 414b is attached to the back surface side of the base 413 with an adhesive layer (not illustrated) interposed therebetween. The electrode 404 and the electrode 411 are respectively arranged in different layers electrically isolated by the reference electrode layer 409, and the electrode 404 functions as a sensing unit, and the electrode 411 functions as a temperature detection sensing unit. Thus, the present technology can also be applied to the self-capacitance type sensor.

Figure 29B:
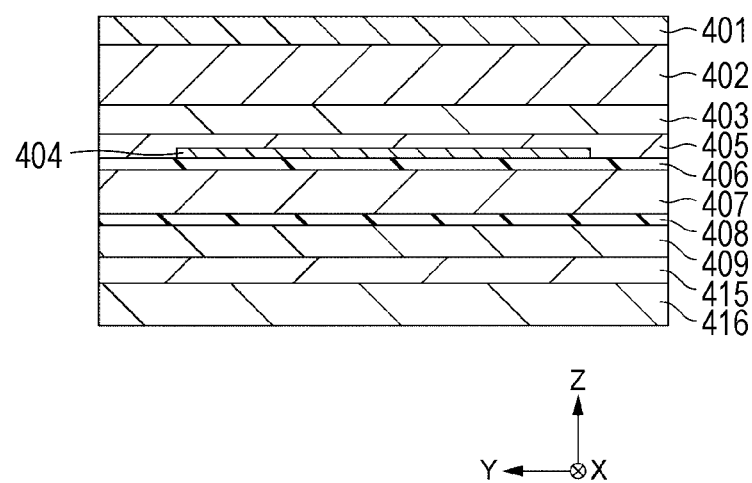

Furthermore, in a case where the present technology is applied to the self-capacitance type sensor, the configuration of the sensor may be one illustrated in FIG. 29B. In other words, another temperature sensor may be provided such as a resistance type provided on the back surface of the reference electrode layer 409 with an adhesive layer 415 interposed therebetween. In this case, the area of the sensing unit is increased, so that an advantage can be obtained of improving the sensitivity.

(Modification of Sensor)

In the embodiment described above, the configuration has been described in which the sensor 20 includes the electrode base 22; however, the sensor 20 does not have to include the electrode base 22. However, to suppress entry of external noise (external electric field) from the back surface of the sensor 20 into the interior, in other words, to suppress an erroneous detection or a decrease in detection accuracy of the sensor 20 due to the external noise, the sensor 20 preferably includes the electrode base 22.

(Modification of Sensor Layer)

In the embodiment described above, the case has been described where the sensor 20 includes the sensor electrode unit 30 of a mutual capacitance type; however, the sensor 20 may include a sensor layer of a self-capacitance type. Specifically, the sensor 20 may include a sensor layer including a thin plate-like electrode, and the electrode may extend substantially the whole of the sensor layer in the in-plane direction of the sensor layer.

(Modification of Electrode Base)

The base 21a does not have to be included. In other words, the sensor 20 may include the REF electrode layer 21b instead of the electrode base 21. Similarly, the base 22a does not have to be included. In other words, the sensor 20 may include the REF electrode layer 22b instead of the electrode base 22.

(Examples of Electronic Device Other than Smartphone)

In the embodiment described above, the case has been described where the electronic device is a smartphone as an example; however, the present technology is not limited thereto, and can be applied to various electronic devices each including an exterior body such as a housing. For example, the present technology can be applied to a personal computer, a mobile phone other than a smartphone, a TV, a remote controller, a camera, a game device, a navigation system, an electronic book, an electronic dictionary, a portable music player, a wearable terminal such as a smart watch or a head mounted display, a radio, a stereo, a medical device, and a robot.

(Modification Other than Electronic Device)

The present technology can be applied not only to electronic devices, but also to various devices other than the electronic devices. For example, the present technology can be applied to electric devices such as an electric tool, a refrigerator, an air conditioner, a water heater, a microwave oven, a dishwasher, a washing machine, a dryer, a lighting device, and a toy. Moreover, the present technology can be applied to a building including a house, a building component, a vehicle, furniture such as a table and a desk, a manufacturing device, an analysis device, and the like. Examples of the building component include a paving stone, a wall material, a floor tile, a floor board, and the like. Examples of the vehicle include a vehicle (for example, a car, a motorcycle, or the like), a ship, a submarine, a railroad vehicle, an aircraft, a spacecraft, an elevator, playground equipment, and the like.

In the embodiment, the example has been described in which the present technology is applied to the side surfaces 10SR and 10SL of the electronic device 10; however, the present technology may be applied to the back surface or front surface of the electronic device.

In the embodiment, a space may be provided between the first deformation layer 28 and the inner side surfaces 11SR and 11SL, or the first deformation layer 28 and the inner side surfaces 11SR and 11SL may be provided to be in contact with or substantially in contact with each other, or the first deformation layer 28 and the inner side surfaces 11SR and 11SL may be provided such that the first deformation layer 28 is pressed in advance by the inner side surfaces 11SR and 11SL.

In the embodiment, the example has been described in which the electronic device 10 includes the second deformation layer 23 between the electrode base 21 and the sensor electrode unit 30, and the second deformation layer 24 between the electrode base 22 and the sensor electrode unit 30; however, only one of the second deformation layers 23 and 24 may be included.

In the embodiment, the example has been described in which the plurality of sensing units 30SE is arranged to form a line in the X-axis direction; however, the sensing units 30SE may be arranged to form two or more lines.

The electronic device 10 may include, as the slide operation area, a zoom in/zoom out operation area in which zoom in and zoom out operation of the camera can be performed by slide operation, on the side surfaces 10SR and 10SL. In this case, the IC 13a is only required to control the zoom in and zoom out of the camera depending on slide operation on the zoom in/zoom out operation area.

The electronic device 10 may include, as the slide operation area, a screen operation area for performing operation of screen display such as screen scrolling or pointer movement by slide operation, on the side surfaces 10SR and 10SL. In this case, the IC 13a is only required to control the screen display such as screen scrolling or pointer movement depending on slide operation on the screen operation area. Note that, the volume adjustment area VR, the zoom in/zoom out operation area, and the screen operation area may be the same area or different areas.

At least one of the second deformation layers 23 or 24 does not have to be included. In a case where the second deformation layer 23 is not included, the electrode base 21 and the sensor electrode unit 30 are bonded together by a thin adhesive layer. On the other hand, in a case where the second deformation layer 24 is not included, the electrode base 22 and the sensor electrode unit 30 are bonded together by a thin adhesive layer.

The second deformation layers 23 and 24 may have a predetermined shape pattern, or may include a plurality of columnar bodies. As the predetermined shape pattern, one can be exemplified similar to the shape pattern of the first deformation layer 28.

The first deformation layer 28 may be bonded to at least one of the sensing surface 20S or back surface of the sensor 20, and provided in advance on the sensing surface 20S and back surface of the sensor 20, or may be bonded to the inner side surfaces 11SR and 11SL of the side wall portions 11R and 11L, and provided in advance on the inner side surfaces 11SR and 11SL of the side wall Portions 11R and 11L, or may be bonded to the support surfaces 12SR and 12SL of the frame 12, and provided in advance on the support surfaces 12SR and 12SL of the frame 12.

In the embodiment described above, the configuration has been described in which the sensor 20 includes the plurality of sensing units 30SE; however, a configuration may be adopted including one sensing unit 30SE.

In the embodiment described above, the configuration has been described in which the sensors 20 and 20 are respectively provided on the inner side surfaces 11SR and 11SL of the side wall portions 11R and 11L; however, a configuration may be adopted in which the sensors 20 and 20 are respectively provided on the outer side surfaces of the side wall portions 11R and in.

Furthermore, the present technology can also adopt the following configurations.

(1)

A sensor including a sensor electrode unit including: a sensing unit of a capacitance type that detects pressing; and a temperature detection sensing unit of a capacitance type provided in an area corresponding to the sensing unit.

(2)

The sensor according to (1), further including a control unit that acquires correction information, depending on a capacitance change of the temperature detection sensing unit, and corrects a signal output from the sensing unit on the basis of the correction information.

(3)

The sensor according to (1) or (2), in which the temperature detection sensing unit is arranged not to have sensitivity to the pressing.

(4)

The sensor according to any of (1) to (3), in which the temperature detection sensing unit includes: a first electrode;

a second electrode that is larger than the first electrode and provided to cover the first electrode; and an adhesive layer interposed between the first electrode and the second electrode.

(5)

The sensor according to (4), in which the temperature detection sensing unit includes a second electrode provided in a horizontal direction of the first electrode.

(6)

The sensor according to (5), in which the temperature detection sensing unit includes two second electrodes respectively provided on both sides in the horizontal direction of the first electrode.

(7)

The sensor according to any of (1) to (3), in which the sensing unit and the temperature detection sensing unit are respectively provided in layers isolated by a conductive layer.

(8)

The sensor according to any of (1) to (3), further including:

a deformation layer including a first electrode and a second electrode, and provided on an operation direction side with respect to the first electrode and the second electrode constituting the sensing unit; and a spacer provided on an operation direction side with respect to the first electrode and the second electrode constituting the temperature detection sensing unit.

(9)

The sensor according to any of (1) to (8), in which the temperature detection sensing unit is provided corresponding to each of the sensing units.

(10)

The sensor according to any of (1) to (8), in which the sensing unit and the temperature detection sensing unit are alternately arranged.

(11)

The sensor according to any of (1) to (8), in which the sensing unit and the temperature detection sensing unit are provided to overlap each other in the thickness direction of the sensor electrode unit.

(12)

An electronic device including the sensor according to any of (1) to (11).

REFERENCE SIGNS LIST

10 Electronic device
28A Deformation layer
30 Sensor electrode
30SE Sensing
30SEA Temperature detection sensing unit
32, 32A Pulse electrode
33, 33A, 33B Sense electrode
68 Spacer

What is claimed is:

1. A sensor comprising:
    a sensor structure including:
        a base;
        a first sensor of a capacitance type that detects pressing, the first sensor being attached to the base; and
        a second sensor of a capacitance type that detects temperature, the second sensor being attached to the base in an area that corresponds to the first sensor and that is subject to the pressing detected by the first sensor, wherein the second sensor has a structure that prevents the pressing detected by the first sensor from interfering with output of the second sensor,
    wherein the second sensor includes:
        a first electrode at a first side of the base;
        a second electrode at a second side of the base opposite the first side, the second electrode being larger than the first electrode and provided to cover the first electrode; and
        an adhesive layer interposed between the first electrode and the second electrode, wherein the pressing occurs at the second side of the base.

2. The sensor according to claim 1, further comprising a controller that acquires correction information depending on a capacitance change of the second sensor, and corrects a signal output from the first sensor on a basis of the correction information.

3. The sensor according to claim 1, wherein the second sensor includes a third electrode provided at a first side of the first electrode in a horizontal direction.

4. The sensor according to claim 3, wherein the second sensor includes a fourth electrode provided at a second side of the first electrode in the horizontal direction.

5. The sensor according to claim 1, wherein the base is flexible.

6. The sensor according to claim 1, wherein the first sensor is one of a plurality of first sensors in the sensor structure, and wherein the second sensor is one of a plurality of second sensors in the sensor structure, and wherein each first sensor is paired with a corresponding second sensor.

7. The sensor according to claim 6, wherein the plurality of first sensors and the plurality of second sensors are alternately arranged along the sensor structure.

8. An electronic device comprising the sensor according to claim 1.

9. A sensor comprising:
    a sensor structure including:
        a base;
        a first sensor of a capacitance type that detects pressing, the first sensor being attached to the base;
        a second sensor of a capacitance type that detects temperature, the second sensor being attached to the base in an area that corresponds to the first sensor and that is subject to the pressing detected by the first sensor, wherein the second sensor has a structure that prevents the pressing detected by the first sensor from interfering with output of the second sensor;
        a deformation layer provided on a first side of the base that deforms toward electrodes of the first sensor when pressed; and
        a rigid spacer provided on the first side of the base and above electrodes of the second sensor, wherein a surface of the deformation layer is coplanar with a surface of the rigid spacer.

10. A sensor comprising:
    a sensor structure including:
        first, second, and third reference electrode layers connected to a ground line;
        a base;
        a first sensor of a capacitance type that detects pressing, the first sensor being located on a first side of the base; and
        a second sensor of a capacitance type that detects temperature, the second sensor being located on a second side of the base opposite the first side, wherein the first sensor, the base, the first, second, and third reference electrode layers, and the second sensor are provided to overlap each other in a thickness direction of the sensor structure;
    wherein the base, the first sensor, and the second sensor are between the first reference electrode layer and the second reference electrode layer in the thickness direction, and
    wherein the third reference electrode layer is between the first sensor and the second sensor in the thickness direction to electrically isolate the first sensor from the second sensor.

* * * * *